United States Patent
Kim et al.

(10) Patent No.: US 12,199,761 B2
(45) Date of Patent: Jan. 14, 2025

(54) METHOD AND DEVICE FOR PERFORMING HARQ OPERATION

(71) Applicant: LG ELECTRONICS INC., Seoul (KR)

(72) Inventors: Jinmin Kim, Seoul (KR); Jeongki Kim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 421 days.

(21) Appl. No.: 17/430,267

(22) PCT Filed: Dec. 16, 2019

(86) PCT No.: PCT/KR2019/017810
§ 371 (c)(1),
(2) Date: Aug. 11, 2021

(87) PCT Pub. No.: WO2020/184817
PCT Pub. Date: Sep. 17, 2020

(65) Prior Publication Data
US 2022/0131641 A1    Apr. 28, 2022

(30) Foreign Application Priority Data
Mar. 11, 2019    (KR) .................. 10-2019-0027392

(51) Int. Cl.
*H04L 1/00*        (2006.01)
*H04L 1/1812*      (2023.01)
*H04W 84/12*       (2009.01)

(52) U.S. Cl.
CPC .......... *H04L 1/0063* (2013.01); *H04L 1/1812* (2013.01); *H04W 84/12* (2013.01)

(58) Field of Classification Search
CPC ... H04L 1/0063; H04L 1/1812; H04L 1/0057; H04L 1/0061; H04L 1/0067; H04L 1/08; H04L 1/1845; H04L 1/1819; H04L 1/00; H04L 65/40; H04W 84/12
See application file for complete search history.

(56) References Cited

U.S. PATENT DOCUMENTS

2011/0119549 A1* 5/2011 Lee ................... H04L 1/1812
                                                714/748
2017/0079071 A1* 3/2017 Zhou .................. H04L 27/261
2019/0393977 A1* 12/2019 Xin ................... H04L 1/0041

FOREIGN PATENT DOCUMENTS

| KR | 10-2005-0120818 | 12/2005 |
| KR | 10-2010-0003578 | 1/2010 |
| KR | 10-1755961 | 7/2017 |
| WO | 2018062660 | 4/2018 |
| WO | 2018161290 | 9/2018 |

* cited by examiner

*Primary Examiner* — Mohammad S Adhami
*Assistant Examiner* — Jesse P. Samluk
(74) *Attorney, Agent, or Firm* — BRYAN CAVE LEIGHTON PAISNER LLP

(57) ABSTRACT

In a wireless local area network (LAN) system, a transmitting STA can encode at least one codeword on the basis of a plurality of data blocks. The transmitting STA can encode a second codeword on the basis of a first data block and a second data block that is continuous with the first data block, in response to a first data block transmission request signal from among the plurality of data blocks. The transmitting STA can transmit the encoded second codeword to a receiving STA.

12 Claims, 34 Drawing Sheets

PPDU Format (IEEE 802.11a/g)

HT PPDU Format (IEEE 802.11n)

VHT PPDU Format (IEEE 802.11ac)

FIG. 18

| 8μs | 8μs | 4μs | 4μs | | | | | | |
|---|---|---|---|---|---|---|---|---|---|
| L-LTF | L-STF | L-SIG | RL-SIG | SIG A | SIG B | STF | LTF | Data | PE |

METHOD AND DEVICE FOR PERFORMING HARQ OPERATION

This application is the National Stage filing under 35 U.S.C. 371 of International Application No. PCT/KR2019/017810 filed on Dec. 16, 2019, which claims priority to Korean Patent Application No. 10-2019-0027392 filed on Mar. 11, 2019, the contents of which are all hereby incorporated by reference herein in their entirety.

BACKGROUND

Technical Field

The present specification relates to a method and apparatus for performing hybrid automatic repeat request (HARQ) operation in a wireless local area network system.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

The present specification proposes technical features that can be improved in a conventional wireless LAN (WLAN) or can be utilized in a new communication standard. For example, the new communication standard may be an extreme high throughput (EHT) specification that is being discussed recently. The EHT standard may use a newly proposed increased bandwidth, an improved PHY protocol data unit (PPDU) structure, an improved sequence, a hybrid automatic repeat request (HARQ) technique, a multi-link, and the like.

SUMMARY

The EHT standard can use the HARQ technique that checks whether the received data has an error or not and requires retransmission when an error occurs. In order to use the HARQ technique, a receiving STA supporting HARQ may attempt error correction on received data and determine whether to retransmit or not by using an error detection code. The receiving STA may request the transmitting STA to retransmit the MPDU in which an error is found. The transmitting STA may need to determine a code word or a block to be transmitted in order to retransmit an MPDU in which an error is found. Therefore, the present specification may suggest a method for determining a code word or a block to be transmitted in order to retransmit an MPDU in which an error is found.

According to some embodiments, a method in a wireless local area network (WLAN) system comprises encoding, by a transmitting station (STA), at least one first codeword based on a plurality of data blocks, transmitting, by the transmitting STA, the at least one first codeword to a receiving STA, receiving, by the transmitting STA, a signal requesting transmission of a first data block among the plurality of data blocks from the receiving STA, in response to the received signal, encoding, by the transmitting STA, at least one second codeword based on the first data block and all or a part of a second data block contiguous to the first data block, and transmitting, by the transmitting STA, the at least one second codeword to the receiving STA.

When an MPDU is set as a transmission unit of a HARQ, since an encoded codeword and a transmission unit of the HARQ do not match, a process for setting a codeword to be retransmitted may be required. According to an embodiment of the present specification, the transmitting STA may set the codeword to be retransmitted based on the relationship between a transmission unit of the HARQ and the encoded codeword. In addition, according to an embodiment of the present specification, since one transmission unit of the HARQ has only one CRC, overhead could be minimized.

BRIEF DESCRIPTION OF THE DRAWINGS

FIG. 18 illustrates an example of a PPDU used in the present specification.

DESCRIPTION OF EXEMPLARY EMBODIMENTS

In the present specification, a slash (/) or comma may indicate "and/or". For example, "A/B" may indicate "A and/or B," and therefore may mean "only A", "only B", or "A and B". Technical features that are separately described in one drawing may be implemented separately or may be implemented simultaneously.

In the present specification, parentheses may indicate "for example". Specifically, "control information (EHT-Signal)" may mean that "EHT-Signal" is proposed as an example of the "control information." Further, the "control information (i.e., EHT-signal)" may also mean that the "EHT-signal" is proposed as an example of "control information."

The following examples of the present specification may be applied to various wireless communication systems. For example, the following examples of the present specification may be applied to a wireless local area network (WLAN) system. For example, the present specification may be applied to IEEE 802.11a/g/n/ac or IEEE 802.11ax. The present specification may also be applied to a newly proposed EHT standard or IEEE 802.11be. Further, the present specification may be applied to a new WLAN stand which has enhanced IEEE 802.11be.

Hereinafter, in order to describe a technical feature of the present specification, a technical feature applicable to the present specification will be described.

Figure 1:
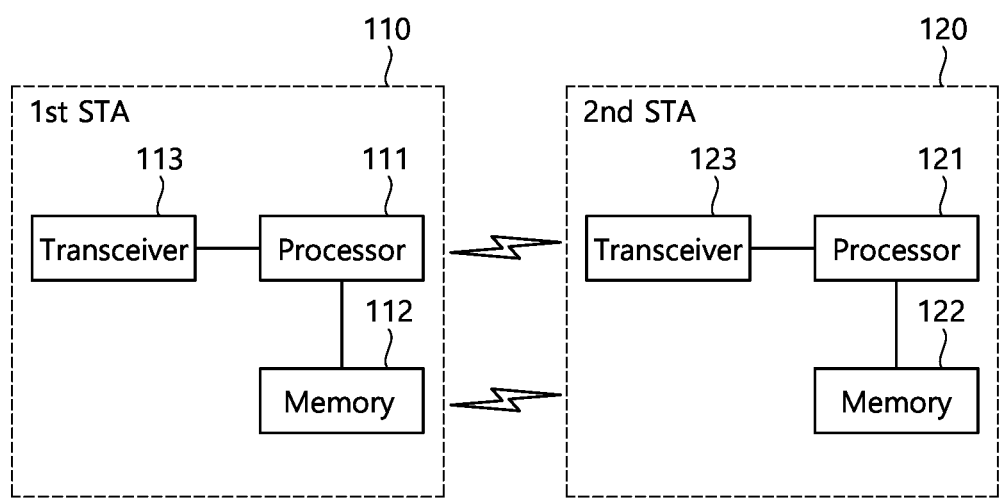
FIG. 1 shows an example of a transmitting apparatus and/or receiving apparatus of the present specification.

FIG. 1 shows an example of a transmitting apparatus and/or receiving apparatus of the present specification.

In the example of FIG. 1, various technical features described below may be performed. FIG. 1 relates to two stations (STAs). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may operate as an AP or a non-AP. That is, the STAs 110 and 120 of the present specification may operate as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like.

The STAs 110 and 120 of the present specification may include a medium access control (MAC) conforming to the IEEE 802.11 standard and a physical layer interface for a radio medium.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an intended operation by a Non-AP STA. For example, the transceiver 123 of the non-AP may perform a signal transmission/reception operation. Specifically, IEEE 802.11 packets (for example, IEEE 802.11a/b/g/n/ac/ax/be, etc.) may be transmitted/received.

For example, the processor 121 of the non-AP STA may receive a signal through the transceiver 123, process the received signal, generate a transmission signal, and perform control for signal transmission. The memory 122 of the non-AP STA may store a signal received through the transceiver 123 (i.e., a received signal), and may store a signal to be transmitted through the transceiver (i.e., a transmission signal).

For example, an operation of a device indicated as an AP in the specification described below may be performed in the first STA 110. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110.

For example, in the specification described below, an operation of a device indicated as a non-AP (or user-STA) may be performed in the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120.

Figure 2:
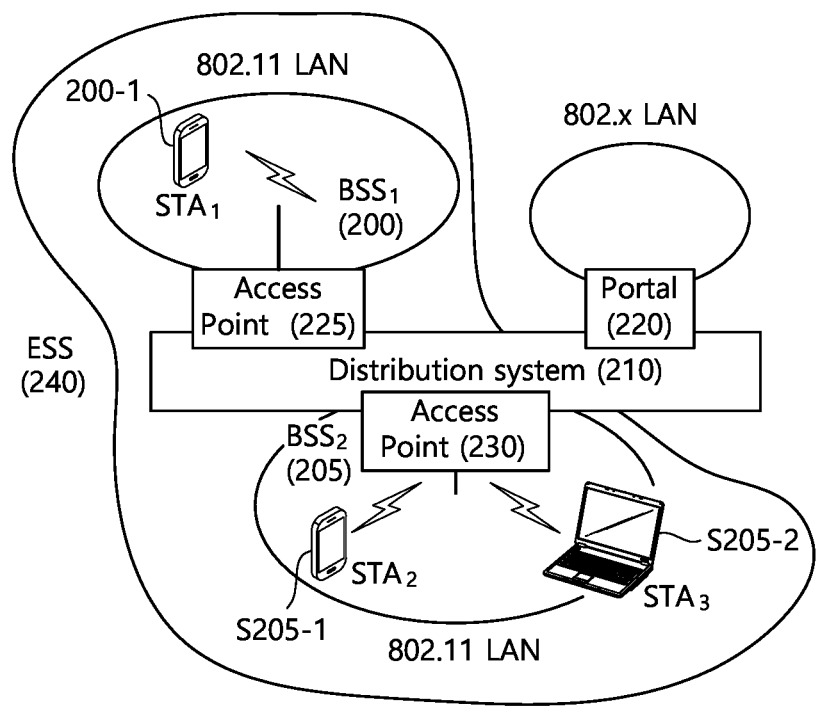
FIG. 2 is a conceptual view illustrating the structure of a wireless local area network (WLAN).
Figure 2:
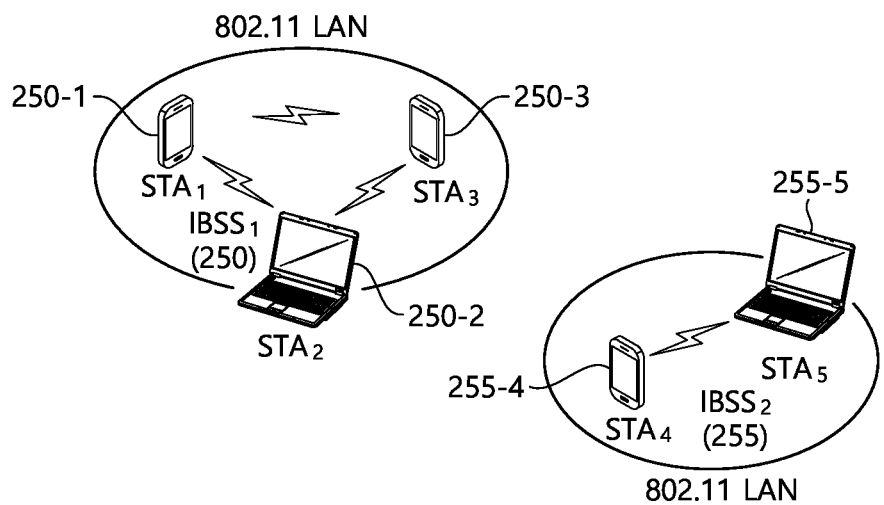

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
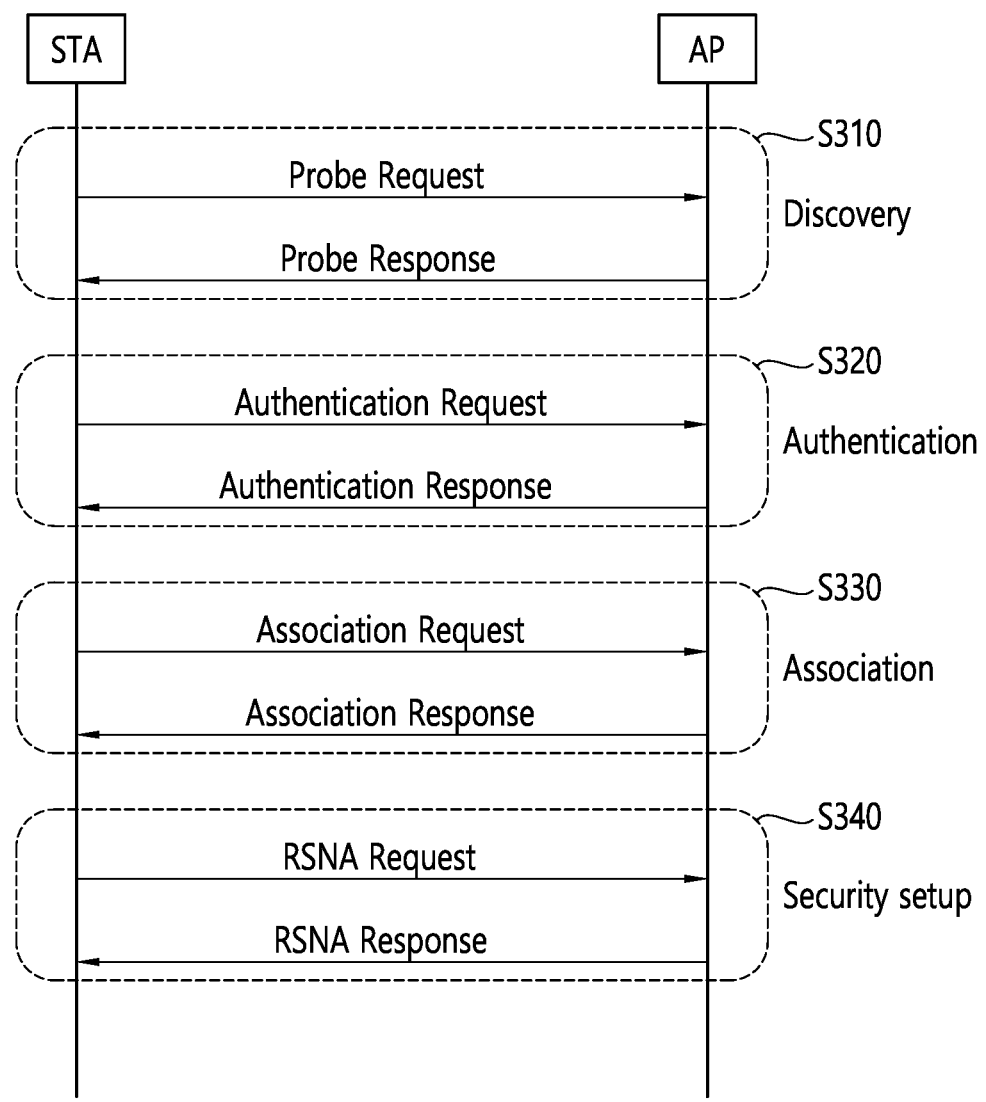
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
FIG. 4 illustrates an example of a PPDU used in an IEEE standard.
Figure 4:
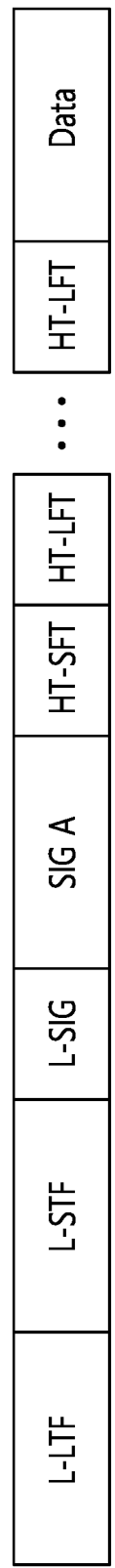
Figure 4:
Figure 4:
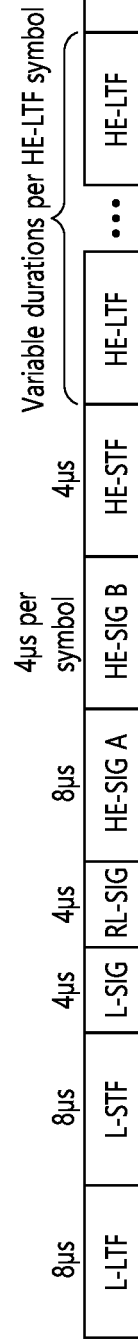

FIG. 4 illustrates an example of a PPDU used in an IEEE standard.

As illustrated, various types of PHY protocol data units (PPDUs) are used in IEEE a/g/n/ac standards. Specifically, a LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
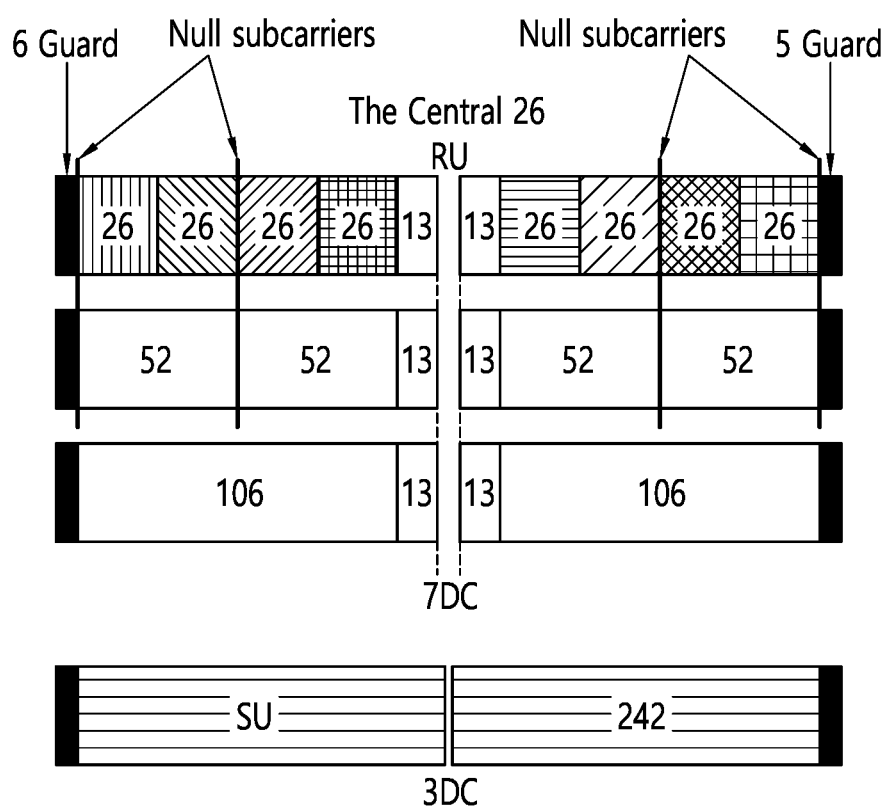
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
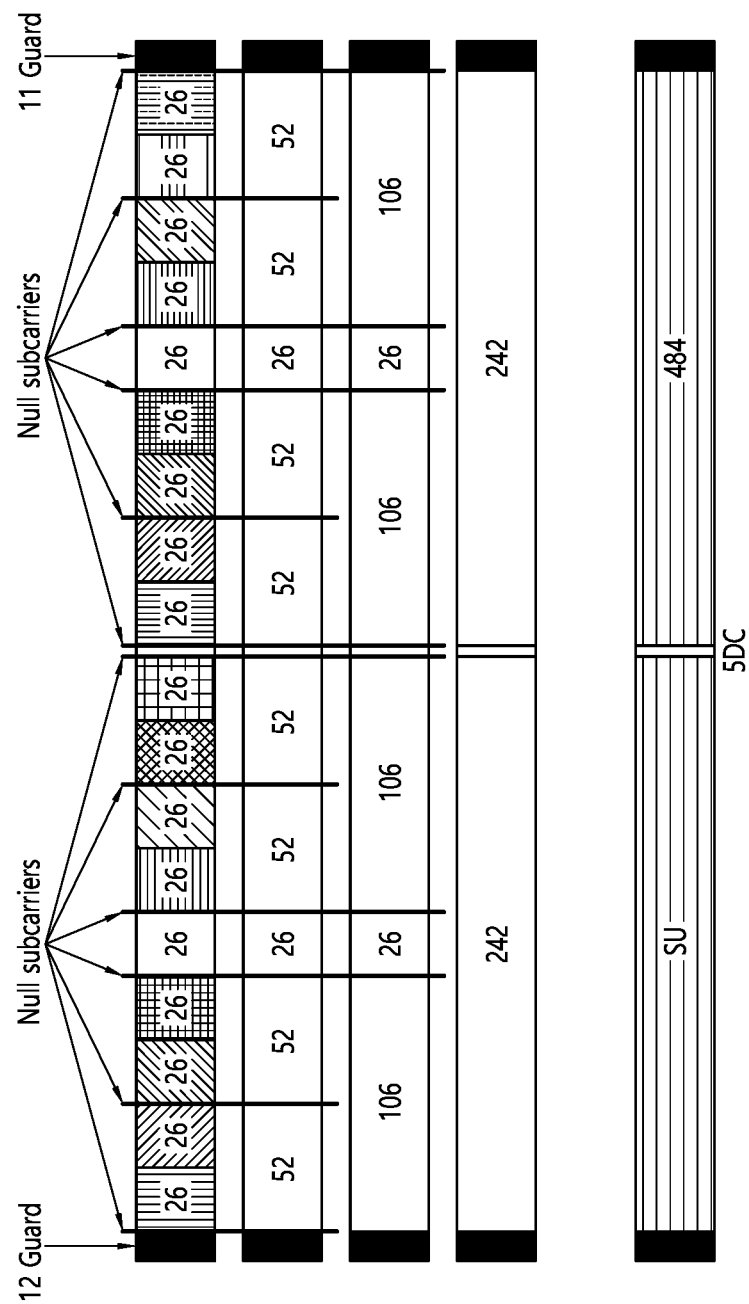
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
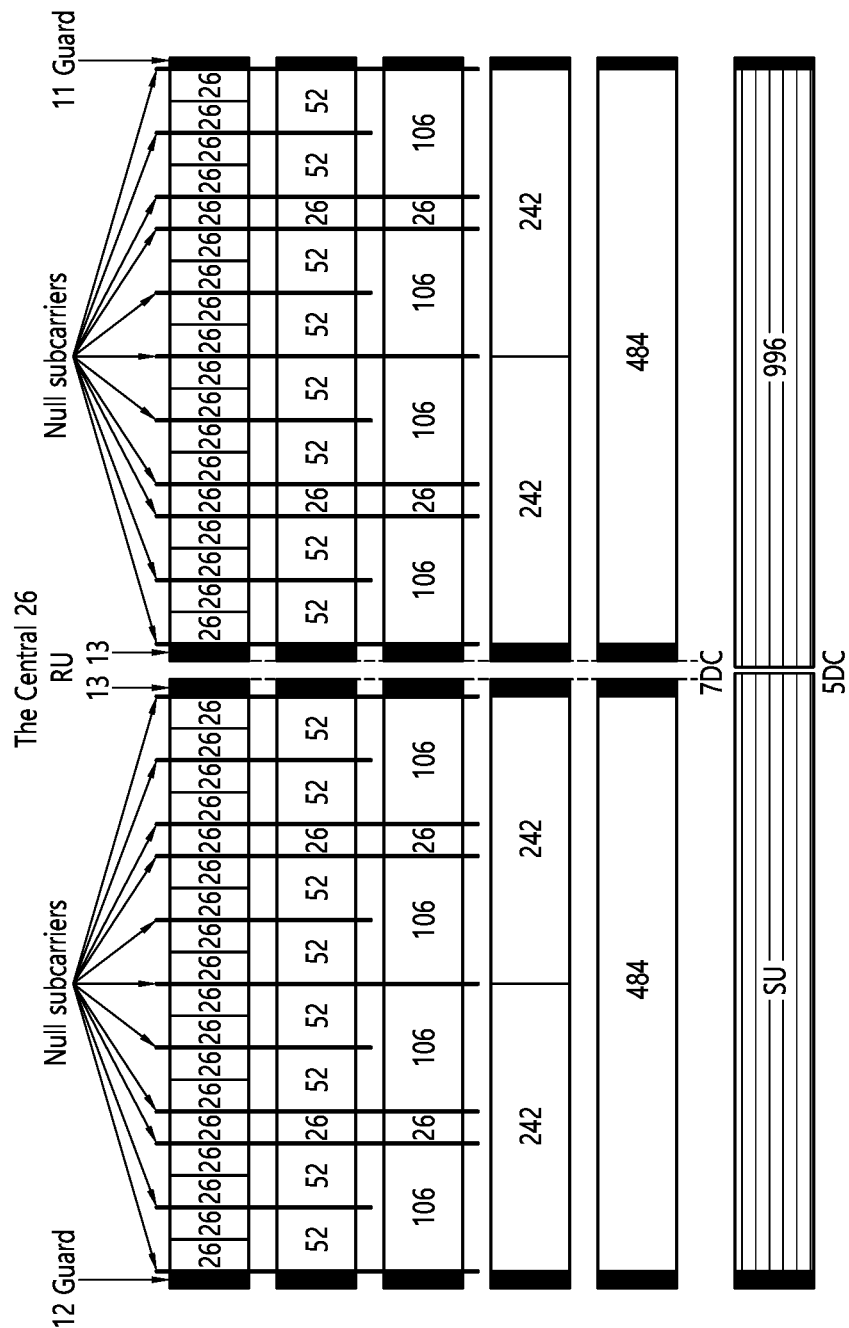
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

In the meantime, the fact that the specific number of RUs can be changed is the same as those of FIGS. 5 and 6.

The RU arrangement (i.e., RU location) shown in FIGS. 5 to 7 can be applied to a new wireless LAN system (e.g. EHT system) as it is. Meanwhile, for the 160 MHz band supported by the new WLAN system, the RU arrangement for 80 MHz (i.e., an example of FIG. 7) may be repeated twice, or the RU arrangement for the 40 MHz (i.e., an example of FIG. 6) may be repeated 4 times. In addition, when the EHT PPDU is configured for the 320 MHz band, the arrangement of the RU for 80 MHz (i.e., an example of FIG. 7) may be repeated 4 times or the arrangement of the RU for 40 MHz (i.e., an example of FIG. 6) may be repeated 8 times.

One RU of the present specification may be allocated for a single STA (e.g., a single non-AP STA). Alternatively, a plurality of RUs may be allocated for one STA (e.g., a non-AP STA).

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
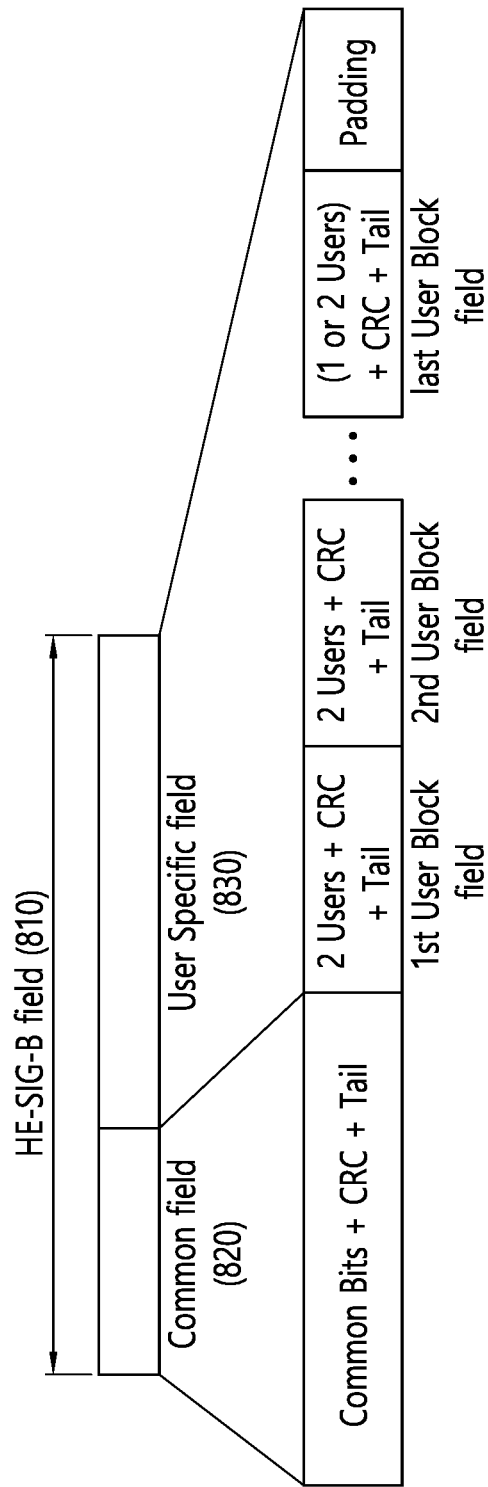
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | 26 | 26 | | 1 |
| 00000011 | 26 | 26 | 26 | 26 | 26 | 52 | 52 | | | 1 |
| 00000100 | 26 | 26 | 52 | 26 | 26 | 26 | 26 | 26 | | 1 |
| 00000101 | 26 | 26 | 52 | 26 | 26 | 26 | 52 | | | 1 |
| 00000110 | 26 | 26 | 52 | 26 | 52 | 26 | 26 | | | 1 |
| 00000111 | 26 | 26 | 52 | 26 | 52 | 52 | | | | 1 |
| 00001000 | 52 | 26 | 26 | 26 | 26 | 26 | 26 | 26 | | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel That is, in the example of FIG. 5, the 52-RU may be allocated to the rightmost side, and the seven 26-RUs may be allocated to the left thereof.

The example of Table 1 shows only some of RU locations capable of displaying the RU allocation information. For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | 106 | | 26 | 26 | 26 | 26 | 26 | | 8 |
| 01001$y_2y_1y_0$ | | 106 | | 26 | 26 | 26 | 52 | | | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000$y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
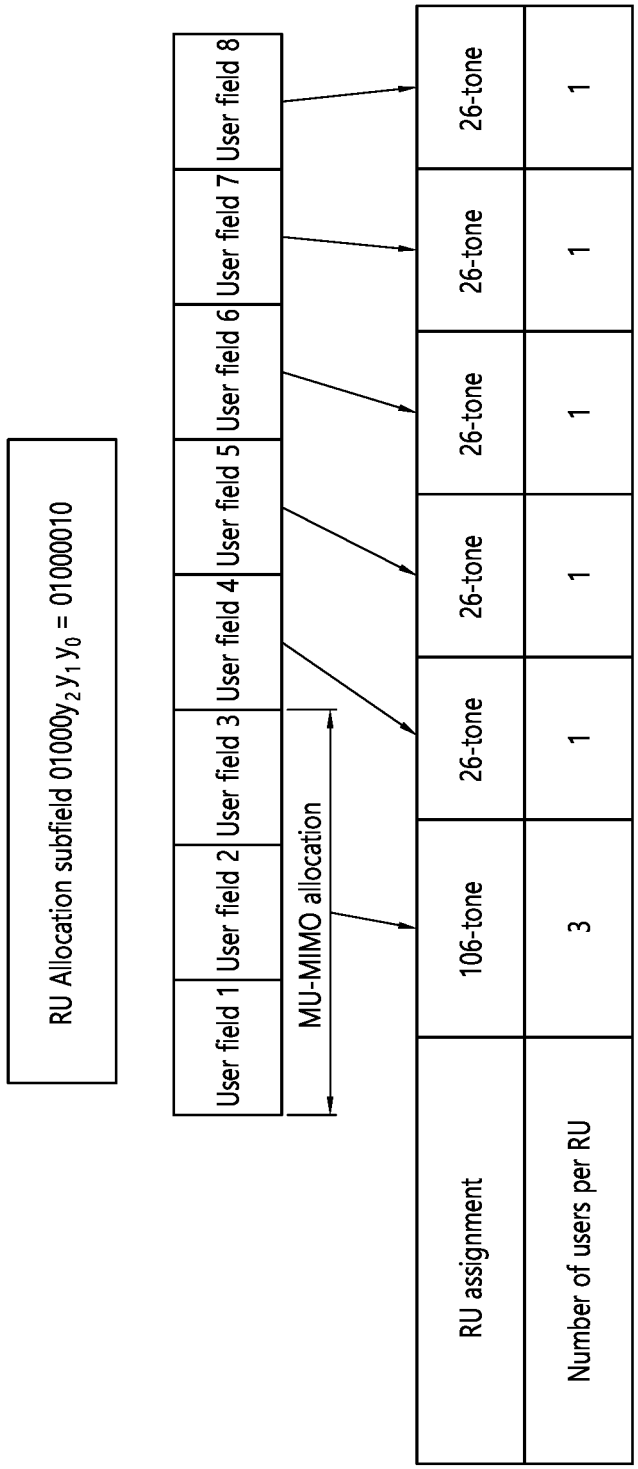
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format.

The first format or the second format may include bit information of the same length (e.g., 21 bits).

Figure 10:
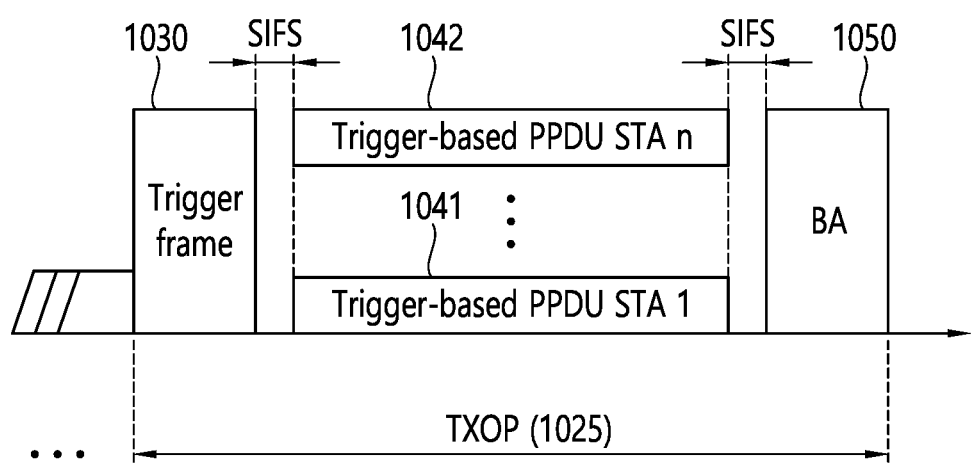
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
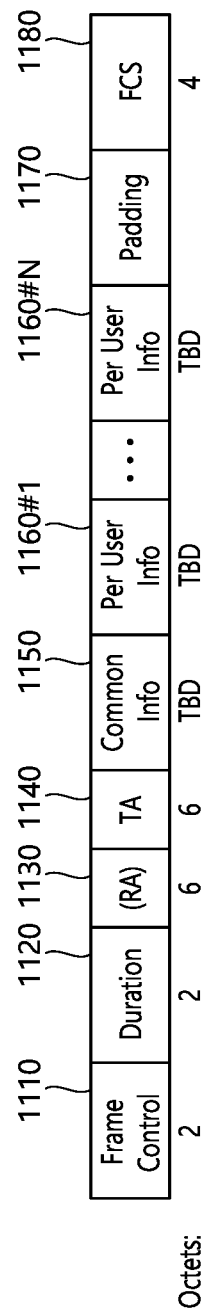
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of an SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
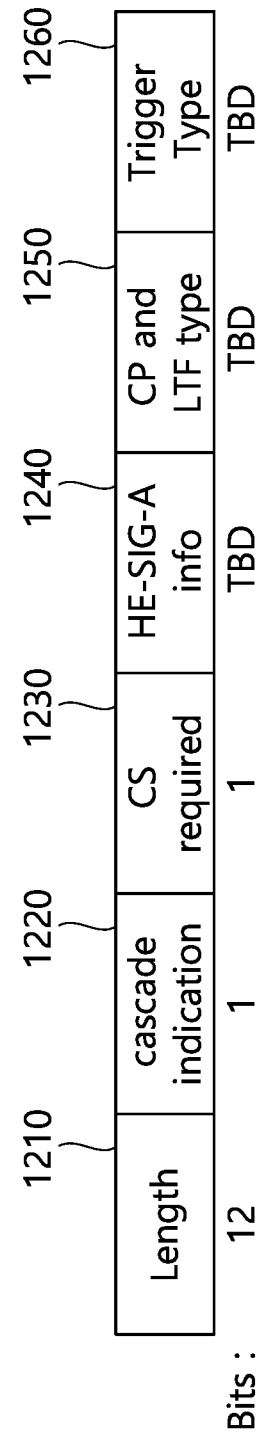
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or an NAV or the like is necessarily considered in a situation where a receiving device which has received a corresponding trigger frame transmits a corresponding uplink PPDU.

An HE-SIG-A information field 1240 may include information for controlling content of an SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
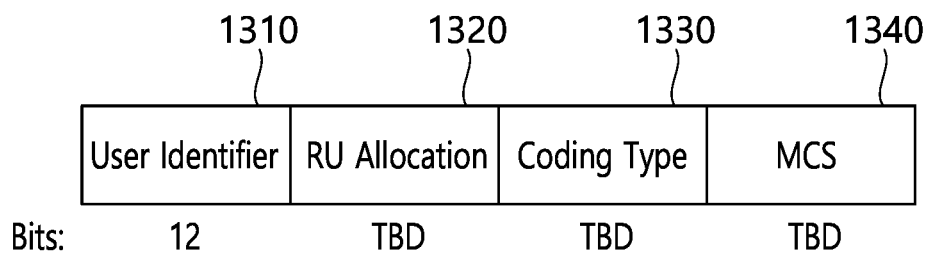
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
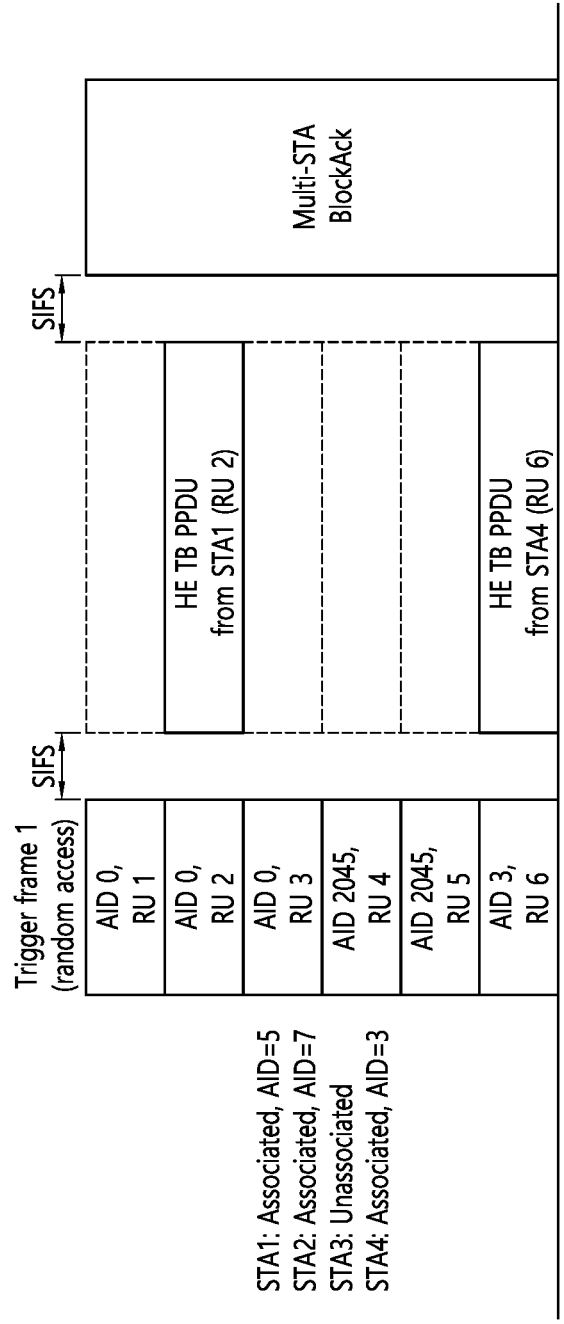
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
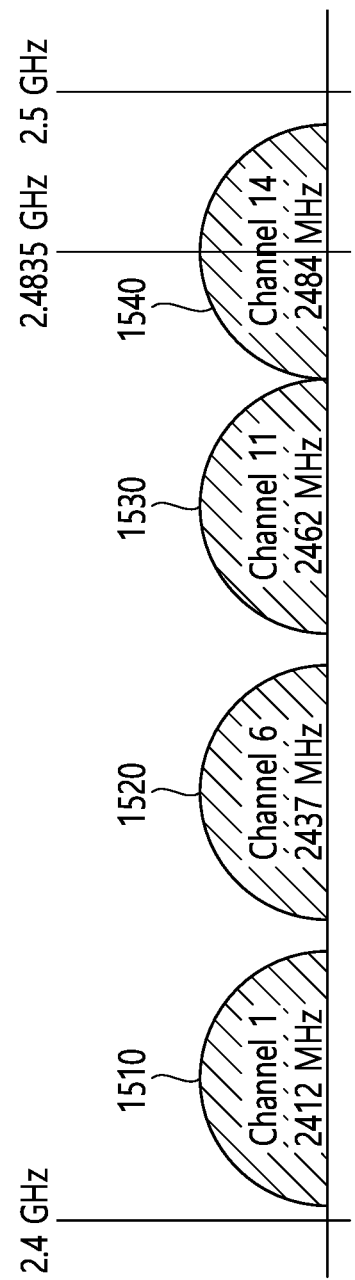
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
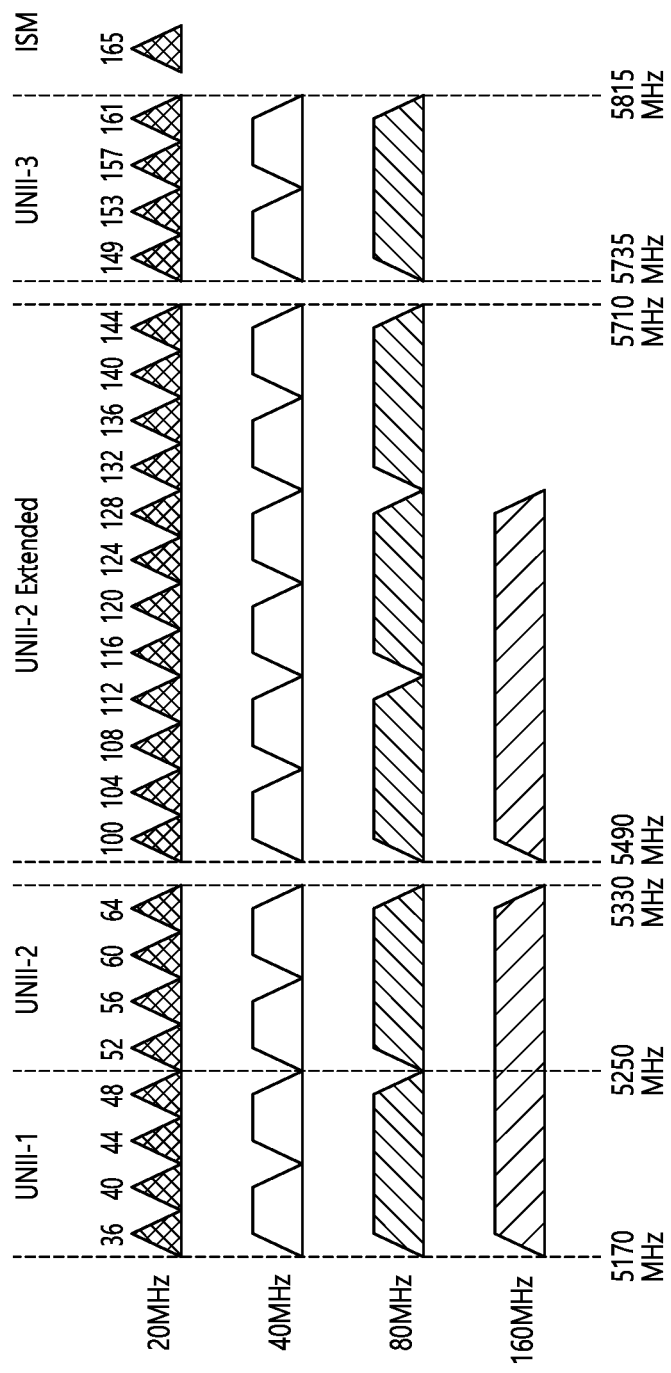
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
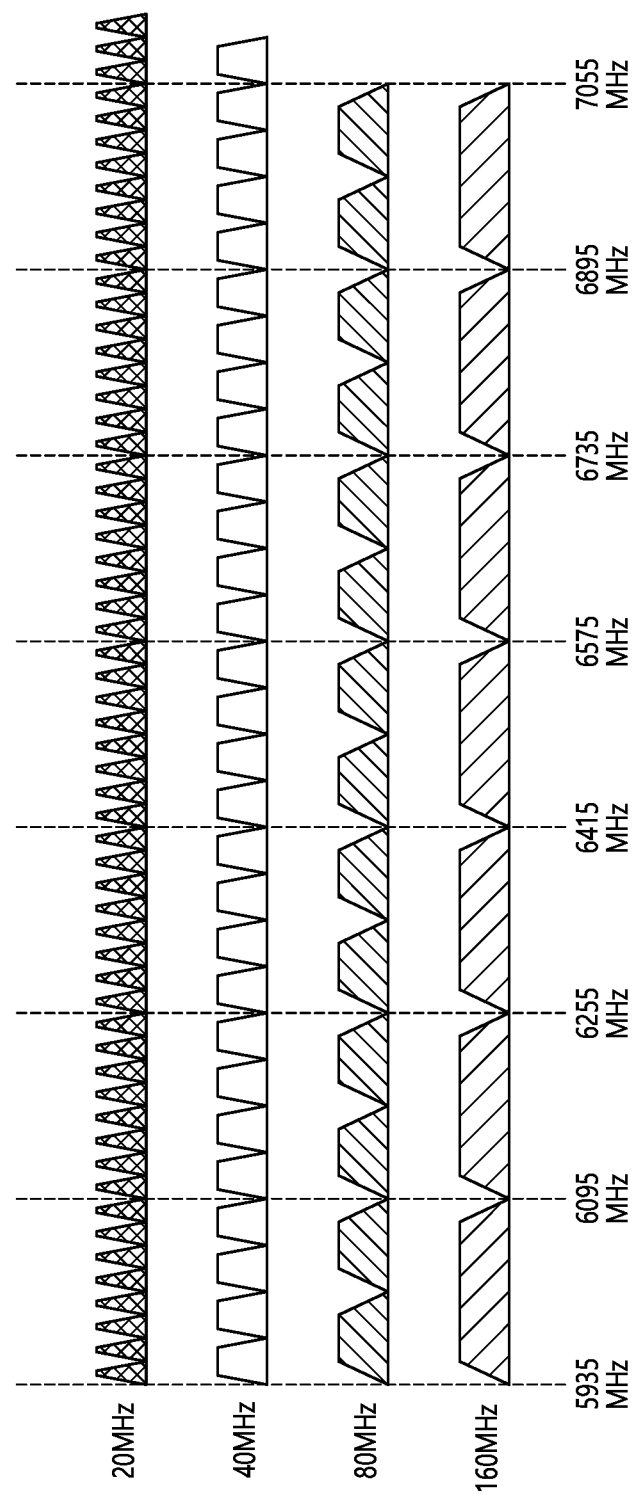
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

FIG. 18 illustrates an example of a PPDU used in the present specification.

The PPDU 1800 depicted in FIG. 18 may be referred to as various terms such as an EHT PPDU, a TX PPDU, an RX PPDU, a first type or N-th type PPDU, or the like. In addition, the EHT PPDU may be used in an EHT system and/or a new WLAN system enhanced from the EHT system.

The subfields 1801 to 1810 depicted in FIG. 18 may be referred to as various terms. For example, a SIG A field 1805 may be referred to an EHT-SIG-A field, a SIG B field 1806 may be referred to an EHT-SIG-B, a STF field 1807 may be referred to an EHT-STF field, and an LTF field 1808 may be referred to an EHT-LTF.

The subcarrier spacing of the L-LTF, L-STF, L-SIG, and RL-SIG fields 1801, 1802, 1803, and 1804 of FIG. 18 can be set to 312.5 kHz, and the subcarrier spacing of the STF, LTF, and Data fields 1807, 1808, and 1809 of FIG. 18 can be set to 78.125 kHz. That is, the subcarrier index of the L-LTF, L-STF, L-SIG, and RL-SIG fields 1801, 1802, 1803, and 1804 can be expressed in unit of 312.5 kHz, and the subcarrier index of the STF, LTF, and Data fields 1807, 1808, and 1809 can be expressed in unit of 78.125 kHz.

The SIG A and/or SIG B fields of FIG. 18 may include additional fields (e.g., a SIG C field or one control symbol, etc.). The subcarrier spacing of all or part of the SIG A and SIG B fields may be set to 312.5 kHz, and the subcarrier spacing of all or part of newly-defined SIG field(s) may be set to 312.5 kHz. Meanwhile, the subcarrier spacing for a part of the newly-defined SIG field(s) may be set to a pre-defined value (e.g., 312.5 kHz or 78.125 kHz).

In the PPDU of FIG. 18, the L-LTF and the L-STF may be the same as conventional L-LTF and L-STF fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to the number of octets of a corresponding Physical Service Data Unit (PSDU). For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG which is identical to the L-SIG. BPSK modulation may be applied to the RL-SIG. The receiving STA may figure out that the RX PPDU is the HE PPDU or the EHT PPDU, based on the presence of the RL-SIG.

After the RL-SIG of FIG. 18, for example, EHT-SIG-A or one control symbol may be inserted. A symbol contiguous to the RL-SIG (i.e., EHT-SIG-A or one control symbol) may include 26 bit information and may further include information for identifying the type of the EHT PPDU. For example, when the EHT PPDU is classified into various types (e.g., an EHT PPDU supporting an SU mode, an EHT PPDU supporting a MU mode, an EHT PPDU related to the Trigger Frame, an EHT PPDU related to an Extended Range transmission, etc.), Information related to the type of the EHT PPDU may be included in a symbol contiguous to the RL-SIG.

A symbol contiguous to the RL-SIG may include, for example, information related to the length of the TXOP and information related to the BSS color ID. For example, the SIG-A field may be contiguous to the symbol contiguous to the RL-SIG (e.g., one control symbol). Alternatively, a symbol contiguous to the RL-SIG may be the SIG-A field.

For example, the SIG-A field may include 1) a DL/UL indicator, 2) a BSS color field which is an identifier of a BSS, 3) a field including information related to the remaining time of a current TXOP duration, 4) a bandwidth field including information related to the bandwidth, 5) a field including information related to an MCS scheme applied to an HE-SIG B, 6) a field including information related to whether a dual subcarrier modulation (DCM) scheme is applied to the HE-SIG B, 7) a field including information related to the number of symbols used for the HE-SIG B, 8) a field including information related to whether the HE-SIG B is generated over the entire band, 9) a field including information related to the type of the LTF/STF, 10) a field indicating the length of the HE-LTF and a CP length.

An STF of FIG. 18 may be used to improve automatic gain control estimation in a multiple input multiple output (MIMO) environment or an OFDMA environment. An LTF of FIG. 18 may be used to estimate a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. For example, a third type of STF (e.g., 4×STF) may be generated based on a third type STF sequence in which a non-zero coefficient is arranged with an interval of 4 subcarriers. An STF signal generated based on the third type STF sequence may have a period of 3.2 μs, and a periodicity signal of 3.2 μs may be repeated 5 times to become a second type STF having a length of 16 μs. Only some of the first to third type EHT-STF sequences may be used. In addition, the EHT-LTF field may also have first, second, and third types (i.e., 1×, 2×, 4×LTF). For example, the first/second/third type LTF field may be generated based on an LTF sequence in which a non-zero coefficient is arranged with an interval of 4/2/1 subcarriers. The first/second/third type LTF may have a time length of 3.2/6.4/12.8 μs. In addition, Guard Intervals (GIs) with various lengths (e.g., 0.8/1/6/3.2 μs) may be applied to the first/second/third type LTF.

The PPDU of FIG. 18 may be determined (or identified) as an EHT PPDU based on the following method.

A receiving STA may determine a type of an RX PPDU 1800 as the EHT PPDU, based on the following aspect.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

A STA (AP and/or non-AP STA) of the present specification may support multilink communication. A STA supporting multilink communication may simultaneously perform communication through a plurality of links. That is, a STA supporting multilink communication may perform communication through a plurality of links during the first time period, and may perform communication through only one of the plurality of links during the second time period.

Multi-link communication may mean communication supporting a plurality of links, and a link may include one channel defined in a 2.4 GHz band, a 5 GHz band, a 6 GHz band, and/or a specific band (for example, 20/40/80/160/240/320 MHz channels), which will be described below. Hereinafter, concept of conventional channel bonding will be described.

For example, in the IEEE 802.11n system, 40 MHz channel bonding may be performed by combining two 20 MHz channels. In addition, 40/80/160 MHz channel bonding may be performed in the IEEE 802.11ac system.

For example, a STA may perform channel bonding for a primary 20 MHz channel (P20 channel) and a secondary 20 MHz channel (S20 channel). A backoff count/counter may be used in the channel bonding process. The backoff count value may be chosen as a random value, and may be decremented during the backoff interval. In general, when the backoff count value becomes 0, the STA may attempt to access the channel.

At the point in time when the P20 channel is determined to be in the idle state during the backoff interval and the backoff count value for the P20 channel becomes 0, the STA performing channel bonding may determine whether the S20 channel has maintained an idle state for a certain period (for example, a point coordination function interframe space (PIFS)). If the S20 channel is in the idle state, the STA may perform bonding on the P20 channel and the S20 channel That is, the STA may transmit a signal (PPDU) through a 40 MHz channel (i.e., a 40 MHz bonding channel) including a P20 channel and an S20 channel.

Figure 19:
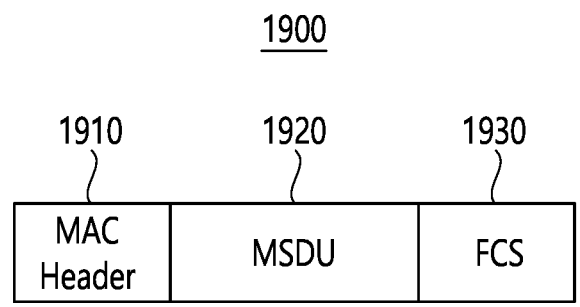
FIG. 19 is a diagram for explaining a structure of an MPDU.

FIG. 19 is a diagram for explaining a structure of an MPDU.

Referring to FIG. 19, an IEEE 802.11 system (i.e., a Wi-Fi system) may support an automatic repeat request (ARQ) operation for a unit of MAC protocol data unit (MPDU). The MPDU 1900 may include a MAC Header 1910, an MSDU 1920, and/or a frame check sequence (FCS) 1930. The IEEE 802.11 system may determine whether there is an error in the MPDU 1900 by using a frame check sequence (FCS) 1930 of the MPDU 1900. The IEEE 802.11 system may use a Cyclical Redundancy Check (CRC) to check whether the MPDU 1900 has an error. The process of determining whether there is an error may be performed in the MAC layer.

Figure 20:
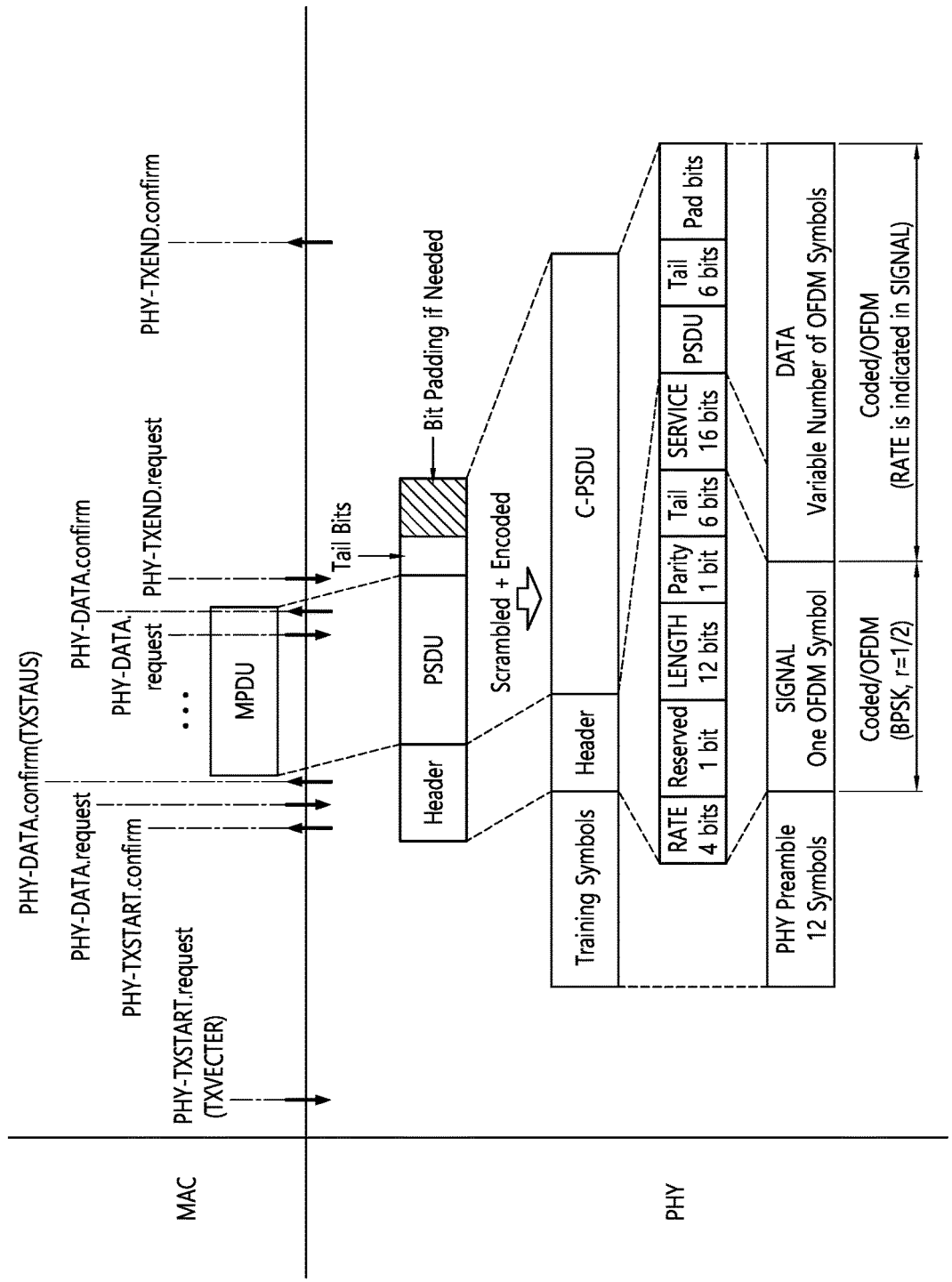
FIG. 20 is a diagram for explaining an operation of a transmitting STA that generates a PPDU based on a Single-MPDU.

FIG. 20 is a diagram for explaining an operation of a transmitting STA that generates a PPDU based on a Single-MPDU.

Referring to FIG. 20, a layer architecture of a transmitting STA (i.e., an IEEE 802.11 system) may include a Medium Access Control (MAC) layer (or sublayer) and a Physical (PHY) layer (or sublayer).

The transmitting STA (for example, the first STA 110 of FIG. 1) may generate/configure an MPDU through a Medium Access Control (MAC) layer. The PHY layer may provide an interface to the MAC layer by TXVECTOR, RXVECTOR, and PHYCONFIG_VECTOR. TXVECTOR may support transmission parameters for each PPDU to the PHY layer. TXVECTOR may be delivered from the MAC layer to the PHY layer through a PHY-TXSTART.request primitive. By using the PHYCONFIG_VECTOR by the transmitting STA, the MAC layer may configure the operation of the PHY layer regardless of frame transmission or reception.

An operation in each sub-layer (or layer) will be briefly described as follows.

The MAC layer may generate one or more MAC protocol data units (MPDUs) by attaching a MAC header and a frame check sequence (FCS) to a MAC Service Data Unit (MSDU) or fragment of an MSDU received from a higher layer (for example, LLC). The generated MPDU may be delivered to the PHY layer.

The PHY layer may generate a Physical Protocol Data Unit (PPDU) by attaching an additional field including information required from the physical layer of the transceiver to a Physical Service Data Unit (PSDU) received from the MAC layer. The generated PPDU may be transmitted through a wireless medium.

Since the PSDU is received by the PHY layer from the MAC, and the MPDU is transmitted by the MAC layer to the PHY layer, the PSDU may be substantially the same as the MPDU.

Figure 21:
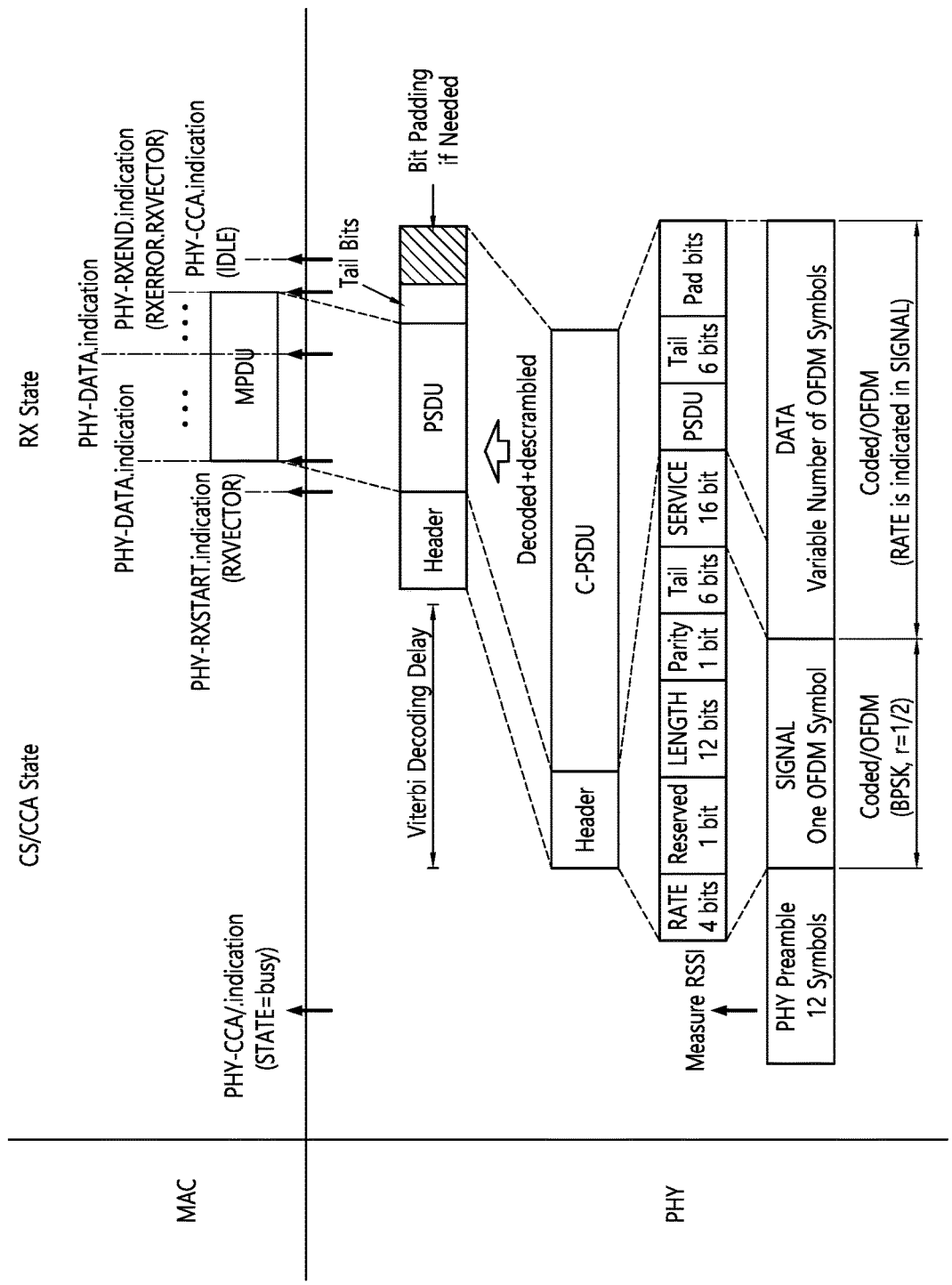
FIG. 21 is a diagram for explaining an operation of a receiving STA that receives a PPDU generated based on a Single-MPDU.

FIG. 21 is a diagram for explaining an operation of a receiving STA that receives a PPDU generated based on a Single-MPDU.

Referring to FIG. 21, a receiving STA (for example, the second STA 120 of FIG. 1) may receive a PPDU through a PHY layer. The receiving STA may have the same structure of the transmitting STA of FIG. 19, and perform the reverse operation of generating the PPDU by the transmitting STA. That is, the receiving STA may obtain the MPDU through the received PPDU.

Specifically, by using the reception RXVECTOR, the PHY layer may inform the MAC layer of parameters for the received PPDU. RXVECTOR may be delivered from the PHY layer to the MAC layer through the PHY-RXSTART.indication primitive. The receiving STA may obtain an MPDU included in the received PPDU. The receiving STA may check whether there is an error in the MPDU by using the CRC of the MPDU.

Figure 22:
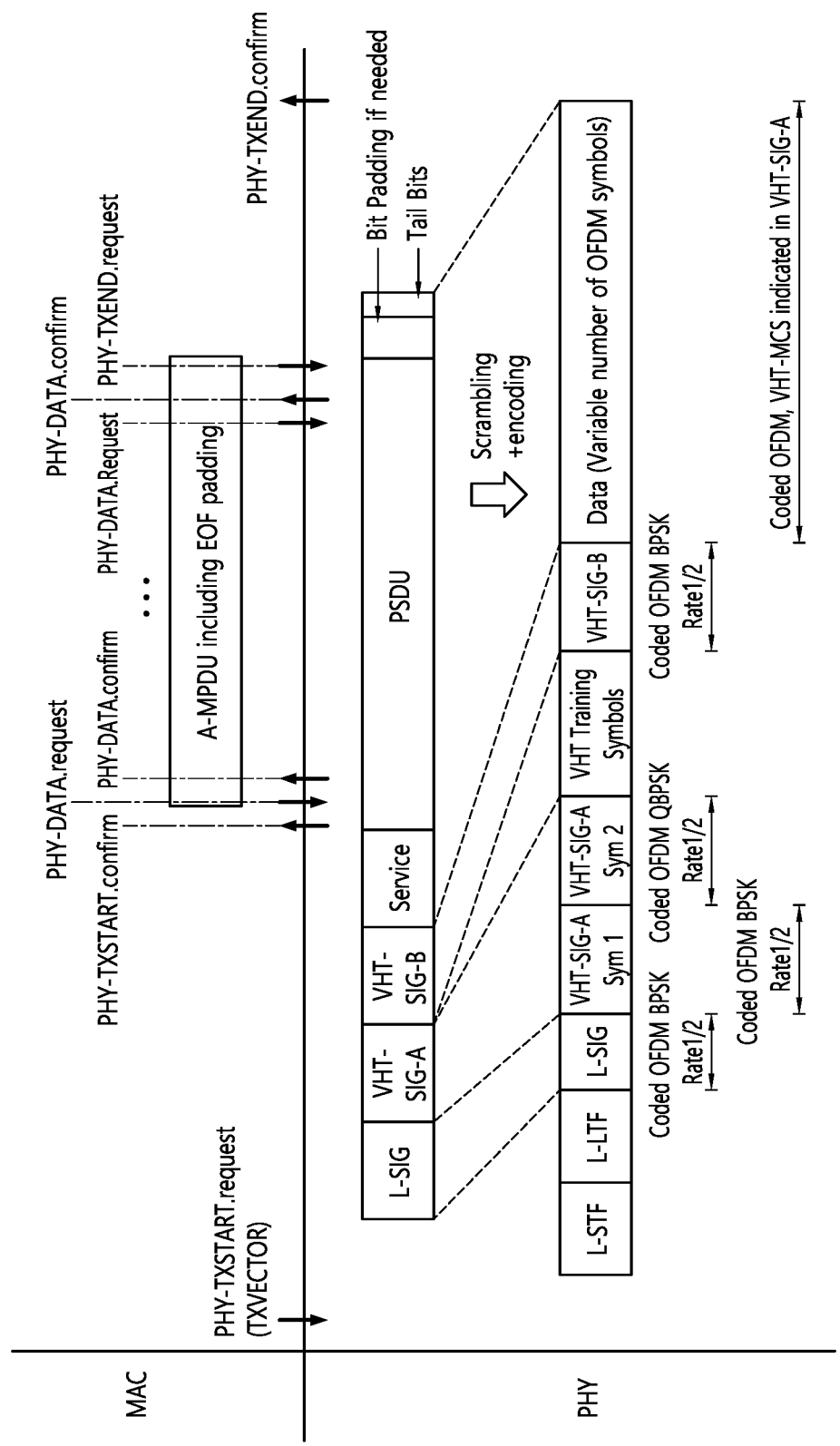
FIG. 22 is a diagram for explaining an operation of a transmitting STA that generates a PPDU based on an A-MPDU.

FIG. 22 is a diagram for explaining an operation of a transmitting STA that generates a PPDU based on an A-MPDU.

Referring to FIG. 22, a transmitting STA may include the same structure of the transmitting STA of FIG. 19. When an aggregated MPDU (A-MPDU) scheme is used, a plurality of MPDUs may be aggregated into a single A-MPDU. The MPDU aggregation operation may be performed at the MAC layer. In the A-MPDU, various types of MPDUs (for example, QoS data, ACK (Acknowledge), block ACK (BlockAck), etc.) may be aggregated. The PHY layer may receive an A-MPDU as a single PSDU from a MAC layer. That is, a PSDU may consist of a plurality of MPDUs. Accordingly, the A-MPDU may be transmitted through the wireless medium within a single PPDU. The transmitting STA may transmit a PPDU generated based on the A-MPDU to the receiving STA.

Figure 23:
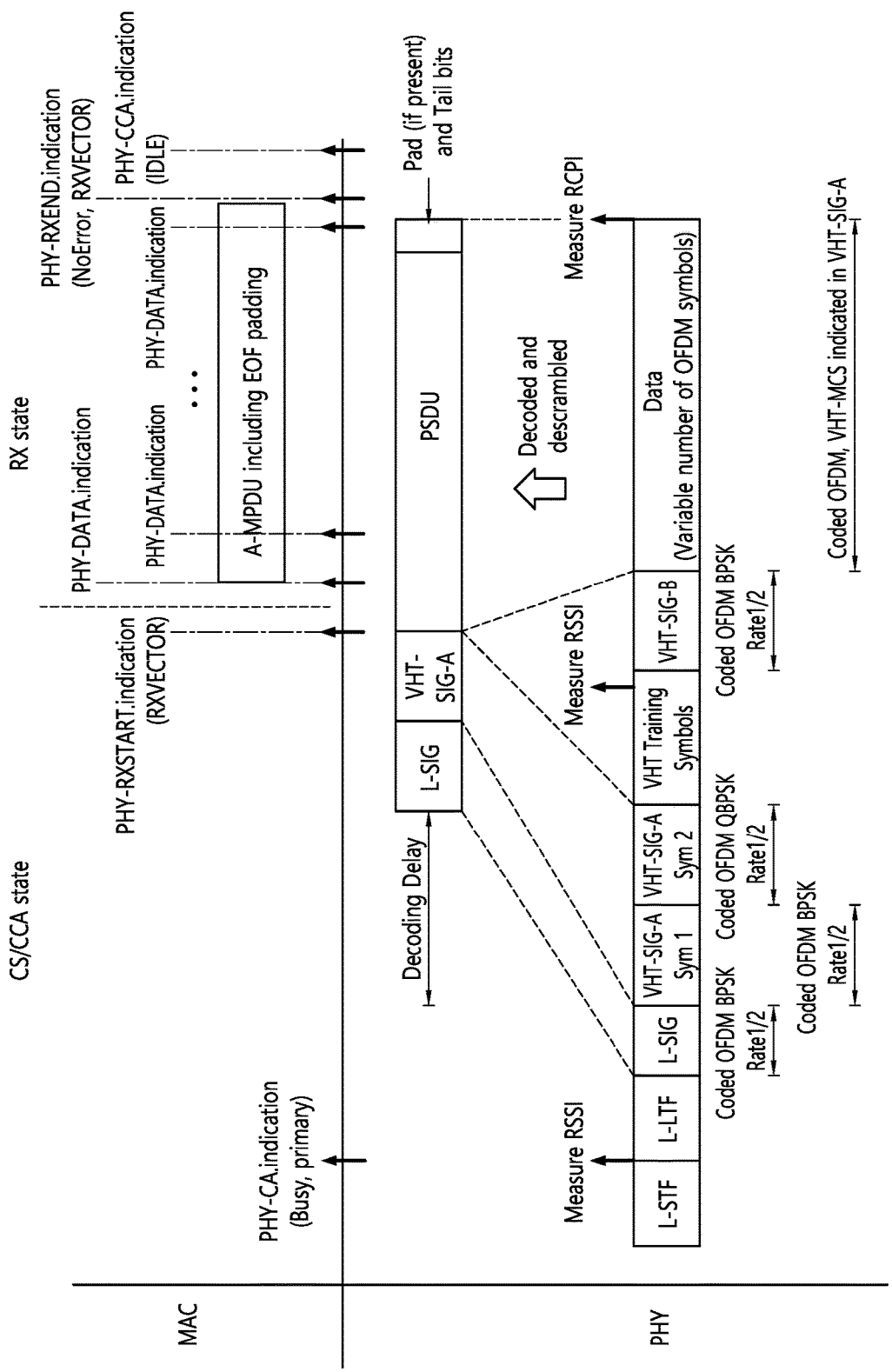
FIG. 23 is a diagram for explaining an operation of a receiving STA that receives a PPDU generated based on an A-MPDU.

FIG. 23 is a diagram for explaining an operation of a receiving STA that receives a PPDU generated based on an A-MPDU.

Referring to FIG. 23, a receiving STA (for example, the second STA 120 of FIG. 1) may receive a PPDU through a PHY layer. The receiving STA may include the same structure of the transmitting STA of FIG. 19. Upon receiving the PPDU, the receiving STA may obtain an A-MPDU. The receiving STA may determine whether each MPDU has an error by using the CRC of each MPDU constituting the A-MPDU.

Hereinafter, the HARQ technique applied to some embodiments of the present specification will be described.

The HARQ technique may be a technique combining a forward error correction (FEC) scheme and an automatic repeat request (ARQ) scheme. According to the HARQ method, the performance can be improved by checking whether data received by the PHY layer includes an error that cannot be decoded, and requesting retransmission when an error occurs.

The HARQ receiver may basically attempt error correction on received data and determine whether to retransmit or not by using an error detection code. The error detection code may be various codes. For example, in the case of using a cyclic redundancy check (CRC), when an error of received data is detected through a CRC detection process, the receiver may transmit a non-acknowledgement (NACK) signal to the transmitter. Upon receiving the NACK signal, the transmitter may transmit appropriate retransmission data according to the HARQ mode. The receiver receiving the retransmission data could improve reception performance by combining and decoding the previous data and the retransmission data.

The mode of HARQ can be classified into chase combining and incremental redundancy (IR). Chase combining is a method of obtaining a signal-to-noise ratio (SNR) gain by combining data for which an error was detected with retransmitted data, without discarding the data. IR is a method of obtaining a coding gain by incrementally transmitting additional redundant information through retransmitted data.

Figure 24:
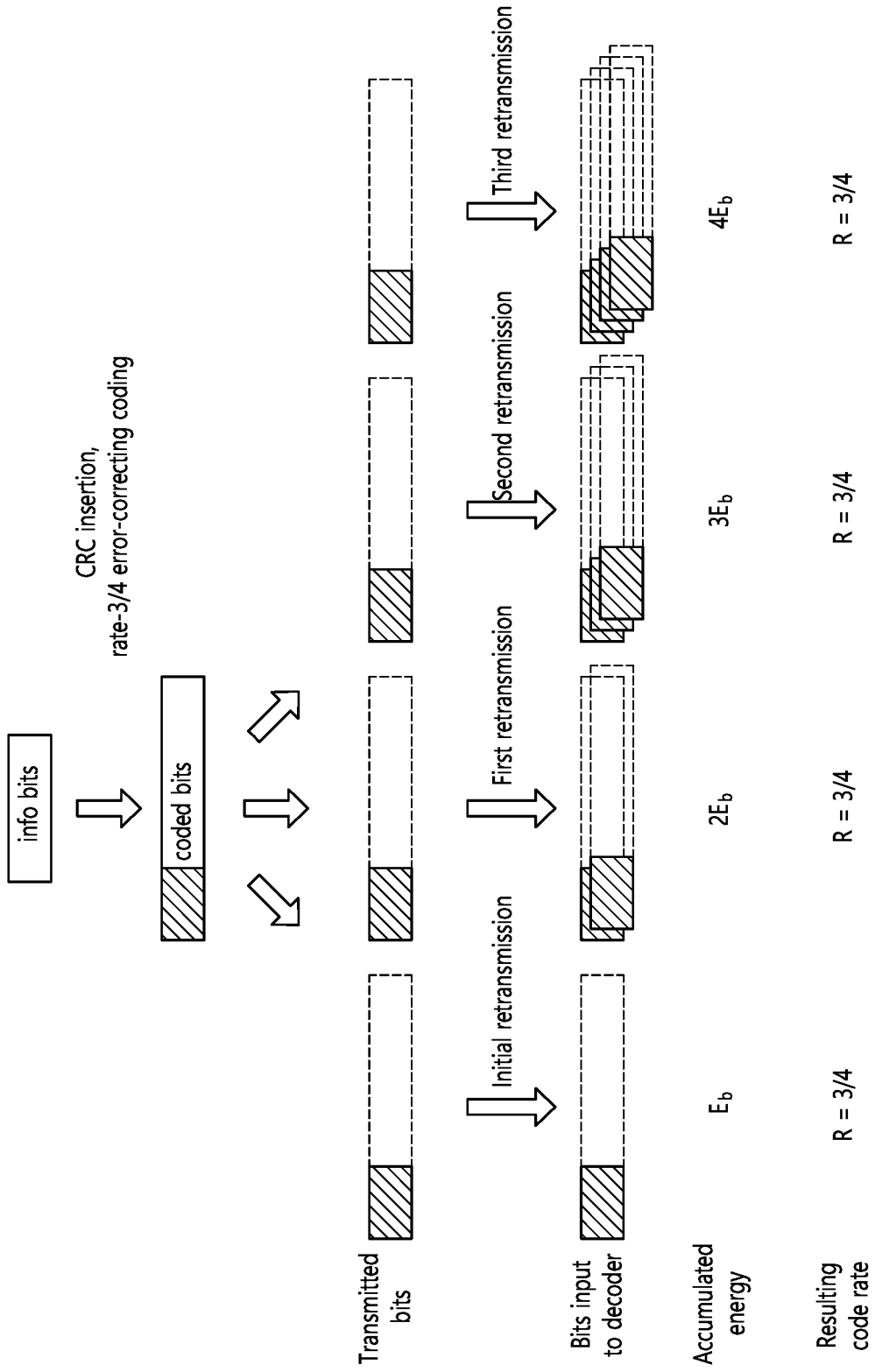
FIG. 24 is a diagram illustrating an example of chase combining.

FIG. 24 is a diagram illustrating an example of chase combining. Chase combining is a method in which the same coded bit as the initial transmission is retransmitted.

Figure 25:
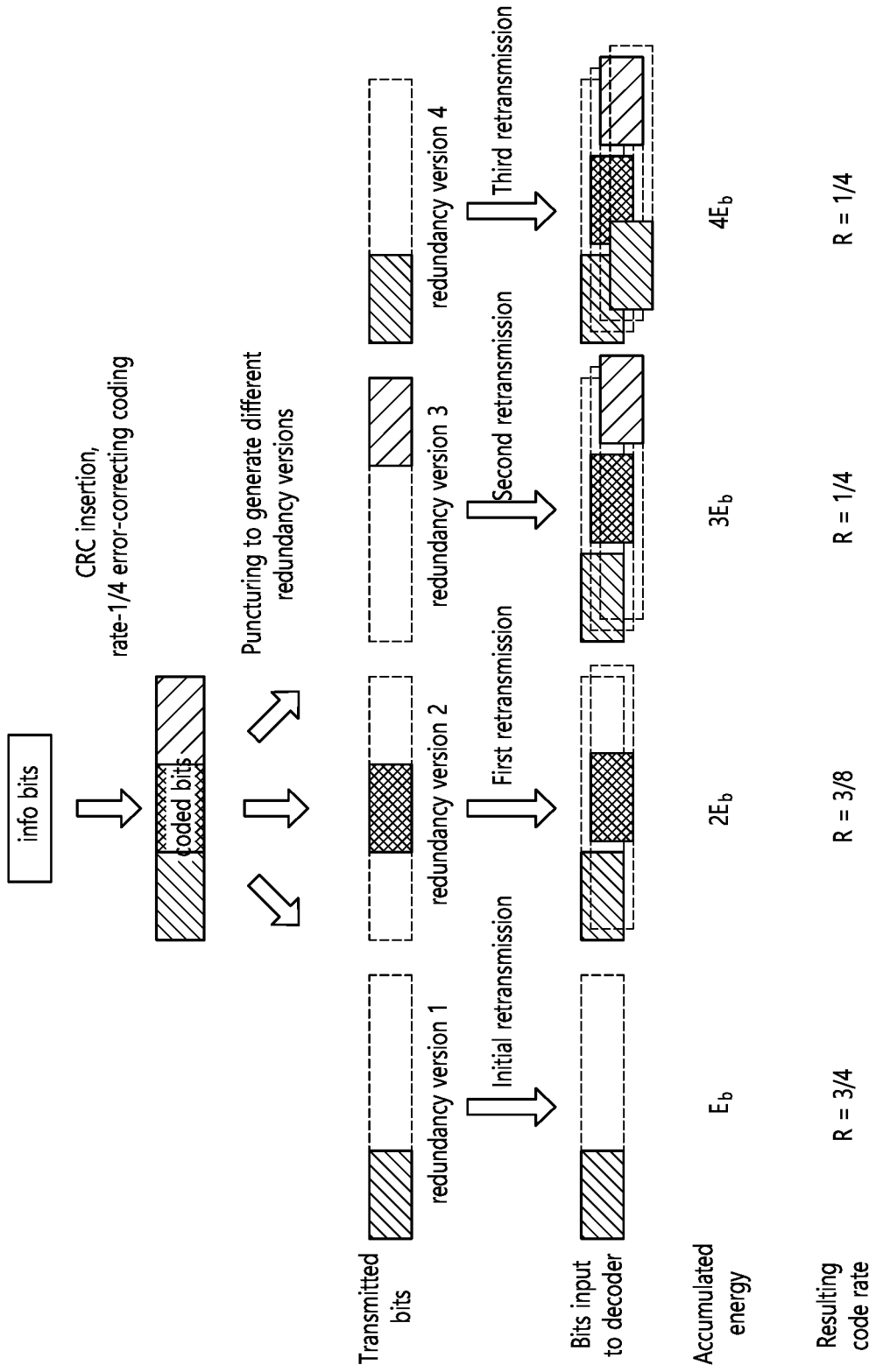
FIG. 25 is a diagram illustrating an example of an incremental redundancy (IR) scheme.

FIG. 25 is a diagram illustrating an example of an incremental redundancy (IR) scheme. In the incremental redundancy (IR) method, the coded bits that are initially transmitted and subsequently retransmitted may be different, as follows. Accordingly, when the IR method is used, the STA performing retransmission generally delivers the IR version (or packet version/retransmission version) to the receiving STA. The following drawing shows an example, of performing retransmission in the order of IR version 1→IR Version 2→IR Version 3→IR Version 1 by the transmitting STA. The receiving STA may combine and decode the received packet/signal.

HARQ may have an effect of expanding coverage in a low SNR environment (for example, an environment in which a transmitter and a receiver are far apart). HARQ may have an effect of increasing throughput in a high SNR environment.

According to the basic procedure of HARQ, a transmitter can transmit packets and a receiver can receive packets. The receiver may check whether received packets have errors. The receiver may feedback a request to the transmitter to retransmit erroneous packets among the received packets. For example, the receiver may transmit a request for retransmission of erroneous packets among packets received through the ACK/NACK frame or the Block ACK frame. The transmitter may receive feedback from the receiver and may retransmit erroneous packets based on the feedback. For example, the transmitter may transmit erroneous packets along with new packets. Packets for which an error is not detected may not be retransmitted. The receiver may perform decoding by combining previously received erroneous packets with retransmitted packets. A method of combining packets includes a method of combining in units of modulation symbols (for example, BPSK, QPSK, 16QAM, 64QAM, 256QAM, 1024QAM, etc.) and a method of combining in units of log likelihood ratio (LLR) values after de-mapper. Hereinafter, it is based on a method of combining in LLR value units. If decoding is performed by combining the previously received packet and the retransmitted packet, but an error occurs, the above procedure can be repeated as many as the predetermined maximum number of retransmissions.

Figure 26:
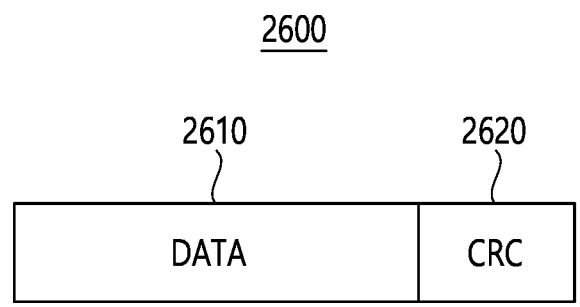
FIG. 26 is a diagram for explaining a transmission unit of HARQ.

FIG. 26 is a diagram for explaining a transmission unit of HARQ.

Referring to FIG. 26, the HARQ operation may use a separate FCS (or CRC) in a PHY layer that does not support HARQ. That is, the HARQ transmission unit 2600 may be defined. The HARQ transmission unit 2600 may include DATA 2610 and/or CRC 2620. The STA supporting HARQ may determine whether there is an error in the DATA 2610 by using the HARQ transmission unit 2600. Specifically, the STA supporting HARQ may determine whether there is an error in the DATA 2610 by the CRC 2620. When there is an error in the DATA 2610, the STA supporting HARQ may request retransmission through feedback.

In the conventional IEEE 802.11 system, FCS does not exist in the PHY layer. Therefore, a separate procedure or device may be required to support HARQ. According to an embodiment, the FCS may be inserted into the PSDU in the PHY Layer. Specifically, the STAs 110 and 120 may insert the FCS at the end of the PSDU. The STAs 110 and 120 may determine whether there is an error in data included in the PSDU in the PHY Layer. According to an embodiment, the STAs 110 and 120 may divide the PSDU into a plurality of block units. The STAs 110 and 120 may generate a PSDU by inserting an FCS for each block. In this case, the FCS may be inserted for an automatic repeat request (ARQ) operation in the MAC layer, and at least one additional FCS may be inserted also for the HARQ operation in the PHY layer. Therefore, the overhead may become large.

According to an embodiment, in order to solve the above-described problem, the MPDU may be configured as a transmission unit of HARQ. When the MPDU is configured as a transmission unit of HARQ, one HARQ transmission unit may have only one CRC. Accordingly, overhead could be minimized.

That is, the STAs 110 and 120 operating as receivers may not determine whether there is an error in the received signal in the PHY layer, but may determine whether there is an error in the received signal by using the FCS of the MPDU in the MAC layer. The STAs 110 and 120 operating as receivers may request retransmission of an erroneous MPDU. In this case, mutual information exchange between the MAC Layer and the PHY Layer within one device may be required.

Since the combination procedure for obtaining the actual HARQ gain and the configuration of the retransmission PPDU are performed in the PHY layer of the receiver and the transmitter, respectively, when the MPDU is configured as a transmission unit of HARQ, the following problem may occur. Hereinafter, low density parity check (LDPC) and binary convolution code (BCC), which are channel coding schemes for solving problems to be described later, may be proposed.

The First Embodiment—when Using LDPC Scheme

Figure 27:
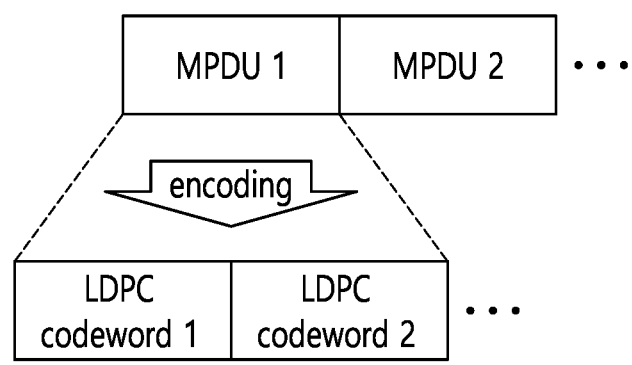
FIG. 27 is a diagram illustrating a relationship with a CW according to an MPDU length.
Figure 28:
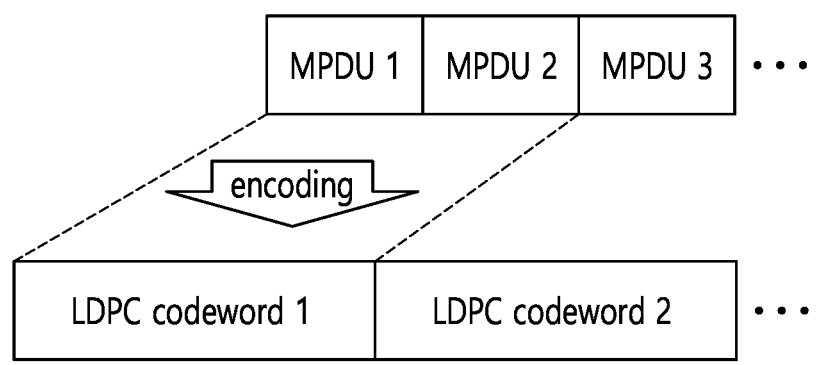
FIG. 28 is another diagram illustrating a relationship with a CW according to an MPDU length.
Figure 29:
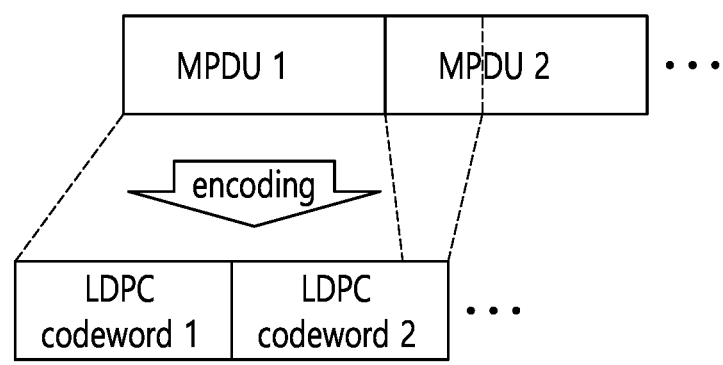
FIG. 29 is another diagram for illustrating a relationship with a CW according to an MPDU length.
Figure 30:
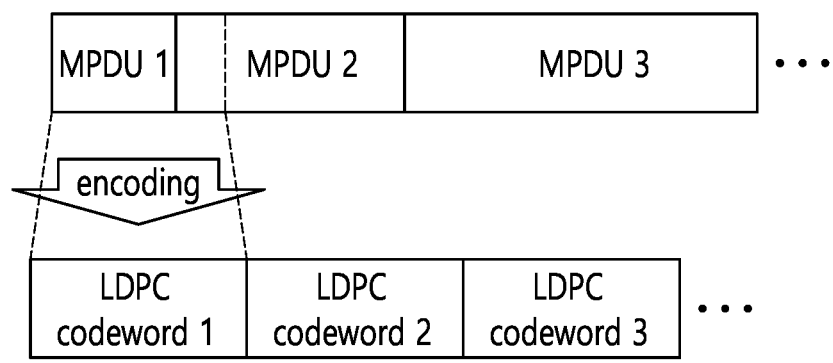
FIG. 30 is another diagram for illustrating a relationship with a CW according to an MPDU length.

LDPC is a channel coding scheme for encoding/decoding by CW (codeword) units. Accordingly, various cases may occur according to the length of the MPDU. FIGS. 27 to 30 may show examples of the various cases. Specifically, FIGS. 27 and 28 show a case in which the length of the encoded MDPU and the length of the CW are set to an integer multiple of each other. FIGS. 29 and 30 show a case in which the length of the encoded MDPU and the length of the CW are not set to an integer multiple of each other.

FIG. 27 is a diagram illustrating a relationship with a CW according to an MPDU length.

Referring to FIG. 27, the length (or size) of one MPDU after encoding may be set to an integer multiple of the length (or size) of CW (or LDPC CW). FIG. 27 may be an example of a case in which the length of one MPDU is twice of the length of the CW.

FIG. 28 is another diagram illustrating a relationship with a CW according to an MPDU length.

Referring to FIG. 28, the length of one CW may be set to an integer multiple of the length of the encoded MDPU. FIG. 28 may be an example of a case in which the length of one CW is set to twice of the length of the encoded MDPU. The encoding process of the above-described embodiment may include LDPC encoding. Accordingly, the encoding process of the above-described embodiment may include a scrambling process and/or a padding process. In addition, the MPDU may additionally include a delimiter.

MPDUs constituting the A-MPDU may have different lengths, and there is no condition that the length of the MPDU and the CW must be an integer multiple of each other. Therefore, the length of the encoded MDPU and the length of the CW may not be set to an integer multiple of each other. FIGS. 29 and 30 show a case where the length of the encoded MDPU and the length of the CW are not set to an integer multiple of each other.

FIG. 29 is another diagram for illustrating a relationship with a CW according to an MPDU length.

Referring to FIG. 29, FIG. 29 shows an example in which one MPDU1 is larger than one CW size and smaller than two. LDPC codeword 2 may include a part of MPDU2.

FIG. 30 is another diagram for illustrating a relationship with a CW according to an MPDU length.

Referring to FIG. 30, when the length of MPDU1 is less than the length of one CW, LDPC codeword 1 may include a part of MPDU2.

As shown in FIGS. 29 and 30, when the LDPC CW consists of a plurality of MPDUs and the receiving STA feedbacks that only some of the plurality of MPDUs have errors, the transmitting STA may need to configure a PSDU/PPDU for retransmission.

Hereinafter, an operation for configuring and transmitting/receiving a PSDU/PPDU may be described, in order to perform HARQ in the transmitting STA and the receiving STA.

Specifically, the transmitting STA may encode at least one first codeword based on the plurality of data blocks. The data block may include a HARQ transmission unit. For example, the data block may include an MPDU. Also, the plurality of data blocks may include an A-MPDU in which a plurality of MPDUs are combined. The transmitting STA may encode the at least one first codeword by at least one of LDPC scheme or BCC scheme.

The transmitting STA may transmit the at least one first codeword to the receiving STA. The transmitting STA may transmit, to the receiving STA, at least one first codeword in which the plurality of data blocks are encoded, in order to transmit the plurality of data blocks to the receiving STA.

The at least one first codeword may be transmitted through a transmitting PPDU. The transmitting PPDU may include identification information for the receiving STA. For example, the identification information on the receiving STA may be all or some bits of the AID of the receiving STA, all or some bits of the MAC ID, or etc. The transmitting STA may insert identification information on the receiving STA into the transmission signal, in various ways. For example, identification information on the receiving STA may be inserted into the information bit of a signal field (for example, SIG-A, SIG-B, etc.) in FIG. 18. That is, the information bit of the signal field (for example, SIG-A, SIG-B, etc.) in FIG. 18 may include a subfield related to identification information on the receiving STA. Alternatively, all or part of the information bits (for example, CRC bits) of the signal field (for example, SIG-A, SIG-B, etc.) in FIG. 18 may be scrambled with identification information on the receiving STA. For example, all or part of the signal field may be scrambled with identification information on the receiving STA, based on an XOR operation or etc.

The receiving STA may receive the at least one first codeword from the transmitting STA. The receiving STA may decode the received at least one first codeword.

A signal transmitted by the transmitting STA may include identification information on the receiving STA in various ways. As described above, all or part of information bits (for example, CRC bits) of a signal field (for example, SIG-A, SIG-B, etc.) may be scrambled with identification information on the receiving STA. The receiving STA may obtain the intended identifier of the receiving STA based on a specific bit/field of the received signal, and may perform a subsequent decoding operation only when the obtained identifier matches the identifier of the receiving STA.

The receiving STA may check/identify/obtain a plurality of data blocks based on at least one first codeword. The receiving STA may check an error on the first data block among the plurality of data blocks. The receiving STA may transmit a signal requesting transmission (or retransmission) of the first data block to the transmitting STA.

The transmitting STA may receive a signal requesting transmission of a first data block among the plurality of data blocks from the receiving STA. The receiving STA may decode the at least one first codeword. In response to the decoding, the receiving STA may detect an error on the first data block among the plurality of data blocks. The receiving STA may transmit a signal requesting transmission of the first data block among the plurality of data blocks. That is, the transmitting STA may receive a signal requesting transmission of the first data block among the plurality of data blocks.

In response to the received signal, the transmitting STA may encode at least one second codeword based on the first data block and all or part of a second data block associated with the first data block. For example, the second data block may be contiguous to the first data block.

Before encoding the at least one second codeword, the transmitting STA may check/identify the second codeword associated with the first data block. For example, in the process of encoding the at least one first codeword, the transmitting STA may check whether all of the first data block is encoded together with all or part of the second data block. As another example, in the process of encoding the at least one first codeword, the transmitting STA may check whether a part of the first data block is encoded together with all or a part of the second data block. After identifying/identifying the second data block, the transmitting STA may encode at least one second codeword based on the first data block and all or a part of the second data block.

The transmitting STA may transmit the at least one second codeword to the receiving STA. The receiving STA may receive the at least one second codeword from the transmitting STA. The receiving STA may decode the at least one second codeword. The receiving STA may check/identify/obtain the first data block based on the at least one second codeword. Accordingly, the receiving STA may check/identify/obtain a plurality of data blocks without an error based on the at least one first codeword and/or the second codeword.

The plurality of data blocks described above may include MPDU1 and/or MPDU2. The at least one first codeword may include CW1 and/or CW2. The at least one second codeword may include CW1 and/or CW2. Hereinafter, for convenience of description, a plurality of data blocks may be described with MPDU1 and/or MPDU2. Also, at least one first codeword and at least one second codeword may be described with CW1 and/or CW2.

When the transmitting STA retransmits an MPDU requiring retransmission, all CWs including even 1 bit of the corresponding MPDU may be reconstructed, and the reconfigured CW may be retransmitted. That is, in order to reconstruct the CW, an MPDU without an error may be reused for retransmission with an error. Accordingly, the previously transmitted CW may be configured identically. According to the above embodiment, information bits before encoding may be configured to be the same for the previous transmission and retransmission. However, in the case of the HARQ IR technique, the retransmitted packet may be composed of new coded bits or CW according to the redundancy version.

Referring back to FIG. 29, in the receiving STA, MPDU1 may have an error and MPDU2 may have no error. Accordingly, the receiving STA may request the transmitting STA to retransmit only MPDU1. In order to retransmit only MPDU1, the transmitting STA may transmit both LDPC MPDU1 and CW2. For this, the first bits of MPDU2 may be used (or reused) to configure CW2.

Referring back to FIG. 30, in the receiving STA, MPDU1 may have an error and MPDU2 may have no error. Accordingly, the receiving STA may request the transmitting STA to retransmit only MPDU1. In order to transmit (or retransmit) only MPDU1, the transmitting STA may use (or reuse) a part of MPDU2 to configure CW1, even though LDPC CW1 includes MPDU1 and a part of MPDU2.

The procedure of the above-described embodiment may be similarly performed in the receiving STA. That is, in order to perform HARQ aggregation, the receiving STA may also have to store all CWs including the erroneous MPDU. In other words, if the receiving STA recognizes that a specific MPDU has an error by using FCS, the receiving STA may request retransmission of the erroneous MPDU. The receiving STA may not only store the corresponding MPDU, but may store all CWs including the erroneous MPDU in order to combine the CWs, after the transmitting STA receives all CWs including the MPDU to be retransmitted.

The Second Embodiment—when Using BCC Scheme

In case of using Binary Convolution Code (BCC) scheme for channel coding, unlike LDCP scheme, CW is not defined. Therefore, when the MPDU is defined as a retransmission unit of HARQ, a new retransmission scheme may be requested by the transmitting STA. In BCC, the state may be changed according to the input signal, and may also affect the output afterwards. Therefore, when an error occurs in a specific MPDU among MPDUs constituting the A-MPDU, the transmitting STA may not be able to reconstruct only the coded bit including only the corresponding MPDU. In other words, if the transmitting STA encodes only the MPDU reported as an error during retransmission and retransmits the MPDU, the receiving STA may not be able to combine the encoded MPDU with previously received information. Accordingly, in the following embodiments, a block corresponding to the LDPC CW proposed in FIG. 31 may be suggested.

Figure 31:
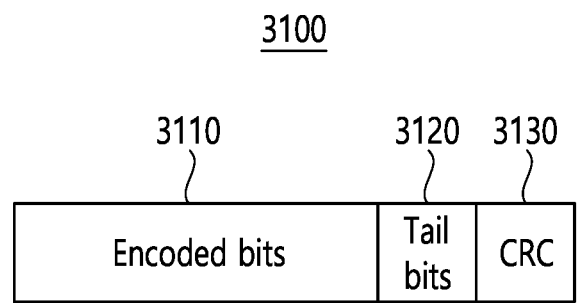
FIG. 31 shows a block corresponding to LDPC CW, when encoding by BCC scheme.

FIG. 31 shows a block corresponding to LDPC CW, when encoding by BCC scheme.

Referring to FIG. 31, a block 3100 may be configured to have the same size (or length) as the LDPC CW. Block 3100 may include Encoded bits 3110, Tail bits 3120, and/or CRC 3130. Also, the block 3100 may be configured to an integer multiple of the size (or length) of the LDPC CW in order to reduce overhead. In this case, when one PPDU is transmitted, the number of CRCs 3130 required may be reduced.

Figure 32:
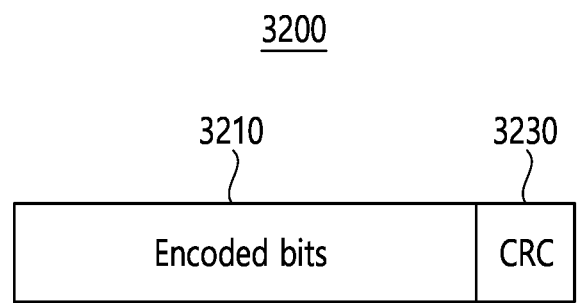
FIG. 32 shows another block corresponding to LDPC CW, when encoding by BCC scheme.

FIG. 32 shows another block corresponding to LDPC CW, when encoding by BCC scheme.

Referring to FIG. 32, a block 3200 may be an encoded block using a tail biting convolution code. Block 3200 may include Encoded bits 3210, and/or CRC 3230. Unlike the block 3100 of FIG. 31, in the block 3200, the tail bits 3120 may be omitted. Accordingly, the transmitting STA and the receiving STA may transmit and/or receive block 3200. The block 3200 may be configured to have the same size (or length) as the LDPC CW. According to an embodiment, the block 3200 may be configured to an integer multiple of the size (or length) of the LDPC CW.

According to an embodiment, when using the BCC, the transmitting STA may initialize a register in the BCC to a specified value (for example, {0}), to make each of all MPDUs into a zero state in order to initialize trellis forcibly.

Since the block proposed in the second embodiment corresponds to the LDPC CW, the transmitting/receiving STA according to the second embodiment could perform the same operation as the transmitting/receiving STA performed in the first embodiment. For example, the transmitting STA may transmit, to the receiving STA, a first block which is encoded based on MPDU 1 and MPDU 2. When the transmitting STA receives the retransmission request of MPDU 1 to the receiving STA, the transmitting STA may encode the first block based on MPDU 1 as well as MPDU 2. The transmitting STA may transmit, to the receiving STA, the first block which is encoded based on MPDU 1 and MPDU 2 in order to transmit (or retransmit) MPDU 1 to the receiving STA.

Figure 33:
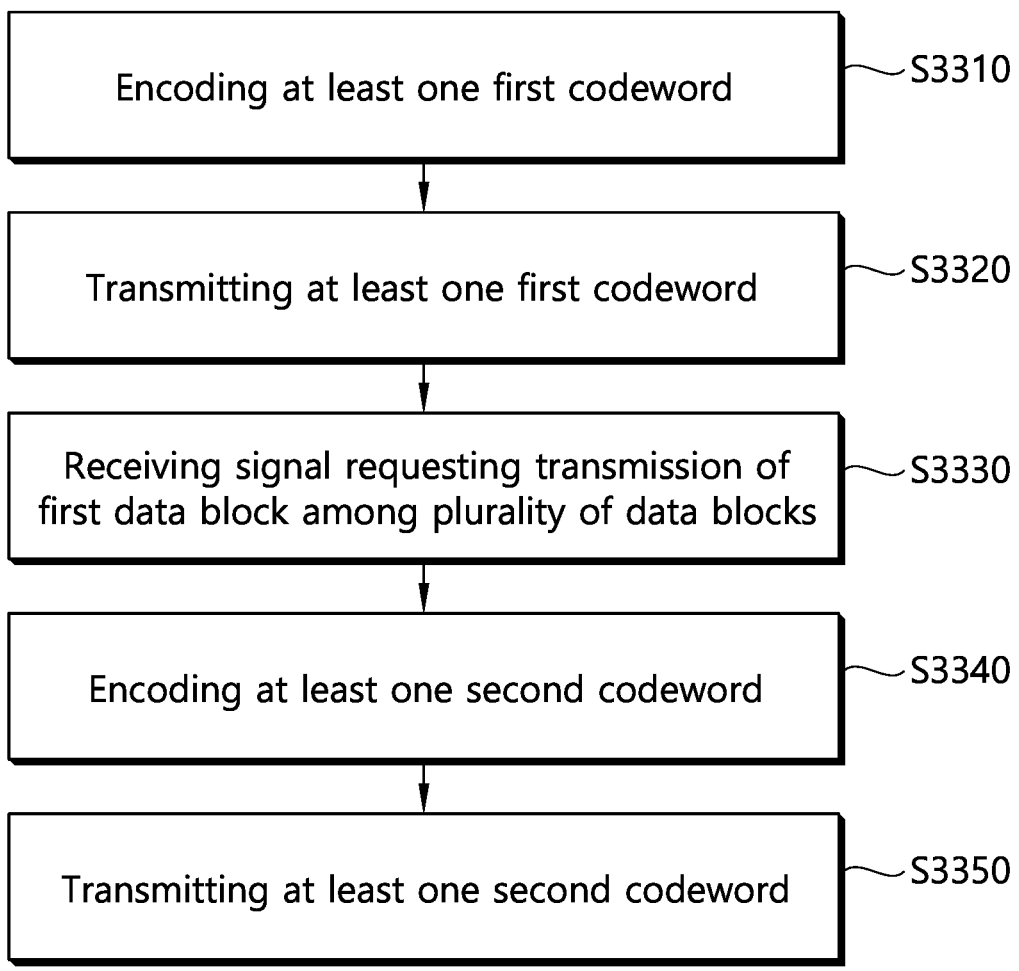
FIG. 33 is a flowchart to explain an example for an operation of a transmitting STA.

FIG. 33 is a flowchart to explain an example for an operation of a transmitting STA.

Referring to FIG. 33, in step S3310, the transmitting STA (for example, the STAs 110 and 120 of FIG. 1) may encode at least one first codeword. In particular, the transmitting STA may encode the at least one first codeword based on the plurality of data blocks. The data block may include a HARQ transmission unit. For example, the data block may include an MPDU. In addition, the plurality of data blocks may include an A-MPDU in which a plurality of MPDUs are combined. The transmitting STA may encode the at least one first codeword by at least one of LDPC or BCC.

For example, the plurality of data blocks may include MPDU1 and/or MPDU2. The at least one first codeword may include CW1 and/or CW2. The transmitting STA may encode CW1 based on MPDU1 and MPDU2. That is, CW1 may mean an element encoded by MPDU1 and MPDU2.

For another example, the transmitting STA may encode CW1 based on MPDU1 and part of MPDU2. That is, CW1 may mean an element encoded by a part of MPDU1 and MPDU2.

For another example, the transmitting STA may encode CW1 and CW2 based on MPDU1 and a part of MPDU2. That is, CW1 may mean an element encoded by MPDU1. CW2 may mean an element encoded by MPDU1 and a part of MPDU2.

In step S3320, the transmitting STA may transmit at least one first codeword to the receiving STA. The transmitting STA may transmit, to the receiving STA, at least one first codeword in which the plurality of data blocks are encoded, in order to transmit the plurality of data blocks to the receiving STA.

The at least one first codeword may be transmitted through a transmit PPDU. Transmitting PPDU may include identification information on the receiving STA. For example, the identification information on the receiving STA may be all or a part of bits of the AID for the receiving STA, all or a part of bits of the MAC ID, and etc. The transmitting STA may insert identification information on the receiving STA into the transmission signal in various ways. For example, identification information on the receiving STA may be inserted into an information bit of a signal field (for example, SIG-A, SIG-B, etc.) in FIG. 18. That is, the information bit of the signal field (for example, SIG-A, SIG-B, etc.) in FIG. 18 may include a subfield related to identification information on the receiving STA. Alternatively, all or a part of the information bits (for example, CRC bits) of the signal field (for example, SIG-A, SIG-B, etc.) in FIG. 18 may be scrambled with identification information on the receiving STA. For example, all or a part of the signal field may be scrambled with identification information on the receiving STA based on an XOR operation or etc.

In operation S3330, the transmitting STA may receive a signal requesting transmission of the first data block among the plurality of data blocks from the receiving STA. The receiving STA may decode the at least one first codeword. In response to the decoding, the receiving STA may check an error on the first data block among the plurality of data blocks. The receiving STA may transmit a signal requesting transmission of the first data block among the plurality of data blocks. That is, the transmitting STA may receive a signal requesting transmission of the first data block among the plurality of data blocks.

In operation S3340, the transmitting STA may encode at least one second codeword based on the first data block and all or a part of a second data block contiguous with the first data block. The transmitting STA may transmit to the receiving STA at least one second codeword encoded based on the first data block, in order to transmit (or retransmit) the first data block to the receiving STA.

For example, the first data block may include MPDU1. The second data block may include MPDU2. The at least one second codeword may include CW1 and/or CW2.

For example, if CW1 is encoded based on MPDU1 and MPDU2, the transmitting STA may encode CW1 again to transmit (or retransmit) the MPDU1 to the receiving STA.

For other example, if CW1 and CW2 are encoded based on MPDU1 and a part of MPDU2, the transmitting STA may encode CW1 and CW2 again based on MPDU1 and the part of MPDU2 in order to transmit (or retransmit) MPDU1 to the receiving STA.

For another example, if CW1 is encoded based on MPDU1 and a part of MPDU2, the transmitting STA may encode CW1 again based on MPDU1 and a part of MPDU2 in order to transmit (or retransmit) MPDU1 to the receiving STA.

In step S3350, the transmitting STA may transmit at least one second codeword to the receiving STA.

Figure 34:
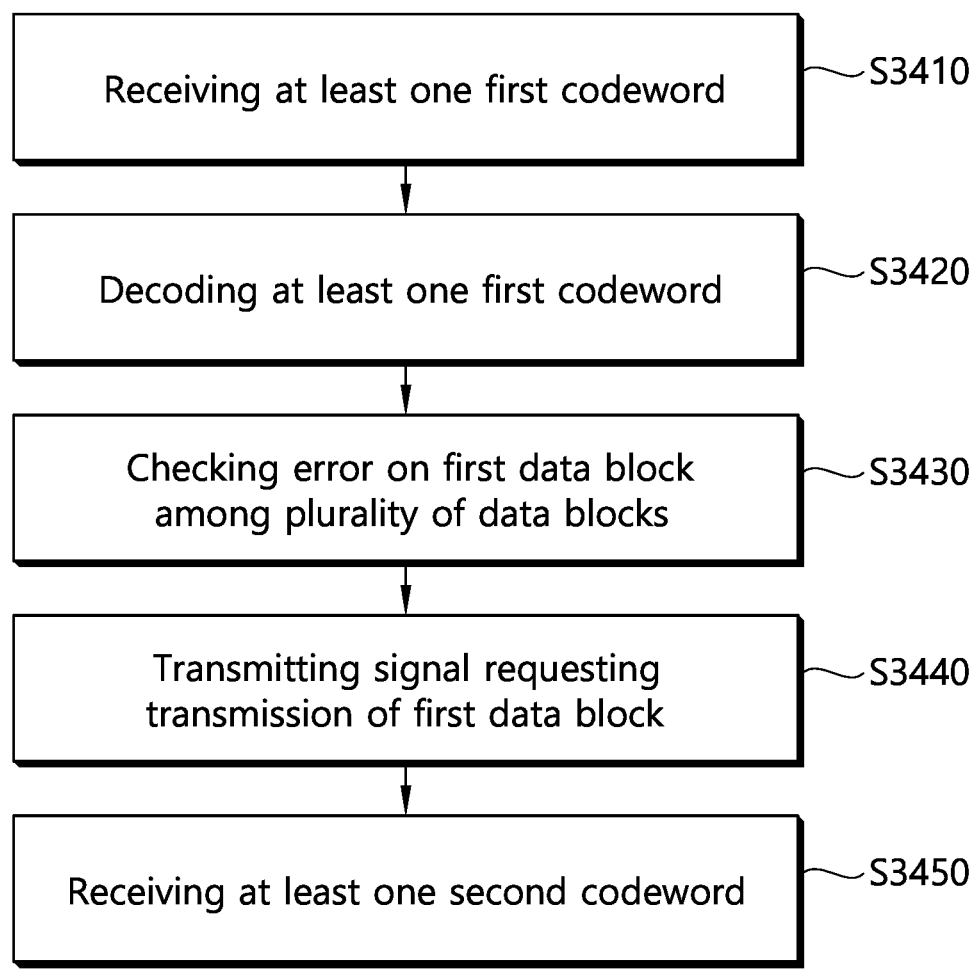
FIG. 34 is a flowchart to explain an example for an operation of a receiving STA.

FIG. 34 is a flowchart to explain an example for an operation of a receiving STA.

Referring to FIG. 34, in step S3410, the receiving STA (for example, the STAs 110 and 120 of FIG. 1) may receive at least one first codeword from the transmitting STA. The at least one first codeword may be an element encoded based on a plurality of data blocks. The data block may include a HARQ transmission unit. For example, the data block may include an MPDU. Also, the plurality of data blocks may include an A-MPDU in which a plurality of MPDUs are combined. The at least one first codeword may be an element encoded by at least one of LDPC scheme or BCC scheme.

In step S3420, the receiving STA may decode at least one first codeword. The receiving STA may verify/identify the plurality of data blocks by decoding the at least one first codeword. The receiving STA may decode at least one first codeword by at least one of LDPC and BCC.

A signal transmitted by the transmitting STA may include identification information on the receiving STA in various ways. As described above, all or a part of the information bits (for example, CRC bits) of the signal field (for example, SIG-A, SIG-B, etc.) may be scrambled with identification information on the receiving STA. The receiving STA may obtain the intended identifier of the receiving STA based on a specific bit/field of the received signal, and may perform a subsequent decoding operation only when the obtained identifier matches the identifier of the receiving STA.

In step S3430, the receiving STA may check an error on the first data block among the plurality of data blocks based on the decoding. Specifically, the receiving STA may attempt an error correction during decoding, and may determine whether to request retransmission by using an error detection code. For example, when CRC is used, the receiving STA may detect an error in the received at least one first codeword by a CRC detection process. In particular, the receiving STA may check the error of the first data block in the at least one first codeword.

In step S3440, the receiving STA may transmit a signal requesting transmission of the first data block to the transmitting STA. For example, the receiving STA may transmit a NACK signal to the transmitting STA. The NACK signal may include information on a transmission request for the first data block.

In step S3450, the receiving STA may receive at least one second codeword from the transmitting STA. At least one second codeword may include information about the first data block. For example, the at least one second codeword may be an element encoded based on a first data block and a second data block contiguous with the first data block. The receiving STA may check/identify the plurality of data blocks without errors based on the at least one first codeword and/or the at least one second codeword.

When the embodiment is implemented in software, the above-described technique may be implemented as a module (process, function, etc.) that performs the above-described operations. A module may be stored in a memory and executed by a processor. The memory may be internal or external to the processor, and may be coupled to the processor by various well-known means.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:
    encoding, by a transmitting station (STA), at least one first codeword based on a plurality of data blocks including an aggregated-MAC protocol data unit (A-MPDU) in which a plurality of MPDUs are combined;
    transmitting, by the transmitting STA, the at least one first codeword to a receiving STA, wherein an error in a first data block among the plurality of data blocks is detected based on the at least one first codeword;
    receiving, by the transmitting STA, a first signal requesting retransmission of the first data block among the plurality of data blocks from the receiving STA;
    in response to the received signal, encoding, by the transmitting STA, at least one second codeword based on the first data block and all or a part of a second data block contiguous to the first data block, wherein the second data block has no error but is used to configure the at least one second codeword, wherein a length of the first and second data blocks and a length of the at least one first and second codeword are not set to an integer multiple of each other; and
    transmitting, by the transmitting STA, the at least one second codeword to the receiving STA,
    wherein a second signal including the at least one first codeword and the at least one second codeword includes identification information of the receiving STA,
    wherein cyclic redundancy check (CRC) bits of a signal field of the second signal are scrambled with the identification information of the receiving STA based on an Exclusive-OR (XOR) operation, and
    wherein the identification information of the receiving STA includes all or some bits of an association identification (AID) of the receiving STA and all or some bits of a Medium Access Control (MAC) identification (ID).

2. The method of claim 1, further comprising determining the second data block contiguous to the first data block, based on the first data block.

3. The method of claim 1,
    wherein the plurality of data blocks are configured by a Medium Access Control (MAC) layer of the transmitting STA, and
    wherein the at least one first codeword or the at least one second codeword is encoded by a Physical (PHY) layer of the transmitting STA.

4. The method of claim 1, wherein the at least one second codeword is set to all or a part of the at least one first codeword.

5. The method of claim 1, wherein the at least one first codeword or the at least one second codeword is encoded by a Low Density Parity Check (LDPC) scheme through a scrambling and padding process.

6. The method of claim 1, wherein the data block includes a MAC Protocol Data Unit (MPDU).

7. A transmitting station (STA) in a wireless local area network (LAN) system, the transmitting STA comprising:
    a transceiver configured to transmit or receive a wireless signal; and
    a processor configured to control the transceiver,
    wherein the processor is further configured to:
    encode at least one first codeword based on a plurality of data blocks including an aggregated-MAC protocol data unit (A-MPDU) in which a plurality of MPDUs are combined;
    transmit the at least one first codeword to a receiving STA, wherein an error in a first data block among the plurality of data blocks is detected based on the at least one first codeword;
    receive a first signal requesting retransmission of the first data block among the plurality of data blocks from the receiving STA, wherein the second data block has no error but is used to configure the at least one second codeword, wherein a length of the first and second data blocks and a length of the at least one first and second codeword are not set to an integer multiple of each other;
    in response to the received signal, encode at least one second codeword based on the first data block and all or a part of a second data block contiguous to the first data block; and
    transmit the at least one second codeword to the receiving STA,
    wherein a second signal including the at least one first codeword and the at least one second codeword include identification information of the receiving STA,
    wherein cyclic redundancy check (CRC) bits of a signal field of the second signal are scrambled with the identification information of the receiving STA based on an Exclusive-OR (XOR) operation, and
    wherein the identification information of the receiving STA includes all or some bits of an association identification (AID) of the receiving STA and all or some bits of a Medium Access Control (MAC) identification (ID).

8. The STA of claim 7, wherein the processor is further configured to determine the second data block contiguous to the first data block, based on the first data block.

9. The STA of claim 7,
    wherein the plurality of data blocks are configured by a Medium Access Control (MAC) layer of the transmitting STA, and
    wherein the at least one first codeword or the at least one second codeword is encoded by a Physical (PHY) layer of the transmitting STA.

10. The STA of claim 7, wherein the at least one second codeword is set to all or a part of the at least one first codeword.

11. The STA of claim 7, wherein the at least one first codeword or the at least one second codeword is encoded, by the transmitting STA, by a Low Density Parity Check (LDPC) scheme through a scrambling process and a padding process.

12. The STA of claim 7, wherein the data block includes a MAC Protocol Data Unit (MPDU).

* * * * *